United States Patent

Satoh

[19]

[11] Patent Number: 5,774,671
[45] Date of Patent: Jun. 30, 1998

[54] SERVICE CHANGEABLE SYSTEM AT AN INFORMATION CENTER

[75] Inventor: Kazuo Satoh, Kawasaki, Japan

[73] Assignee: Fujitsu Limited, Kawasaki, Japan

[21] Appl. No.: 655,680

[22] Filed: Jun. 3, 1996

[30] Foreign Application Priority Data

Oct. 24, 1995 [JP] Japan .................................. 7-275507

[51] Int. Cl.⁶ .............................. G06F 3/14; G06F 15/16
[52] U.S. Cl. ................. 395/200.61; 345/352; 379/93.25; 379/93.12
[58] Field of Search ..................................... 395/334, 340, 395/242, 343, 348, 347, 762, 357, 200.61, 671, 200.47, 676, 684; 364/DIG. 1, DIG. 2, 401 R; 348/134, 8; 455/445, 414; 379/265, 201, 93.12, 93.25; 345/352, 302, 348

[56] References Cited

U.S. PATENT DOCUMENTS

| 5,204,947 | 4/1993 | Bernstein | 395/357 |
| 5,410,326 | 4/1995 | Goldstein | 348/134 |
| 5,414,752 | 5/1995 | Jonsson | 455/445 |

OTHER PUBLICATIONS

Japanese patent application laid-open publication No. 6-187261, Jul. 8, 1994.

*Primary Examiner*—Daniel H. Pan
*Attorney, Agent, or Firm*—Staas & Halsey

[57] ABSTRACT

There is provided a service changeable system at an information center, which is intended to select a service in which a user seems to be interested and to introduce it to the user from the information center side. The user's own profile data is registered in advance in profile data registering means, and service menu control means controls the menu of services which are supplied or mediated by the information center. Service menu transmitting means extracts the taste feature of a user from the profile data registered in the profile data registration means, compares it with the service menu data controlled by the service menu control means to select a service menu matching the taste of the user, and transmits the service menu to a user terminal. Thereupon, the service menu introduced from the information center is transmitted by being changed according to the user, so that time taken for the user to look for a service suitable to the user from a large number of services can be saved.

15 Claims, 43 Drawing Sheets

| DATA FOR IDENTIFYING USER | NAME<br>ID NUMBER<br>SEX<br>DOMICILE<br>TELEPHONE NO.<br>DATE OF BIRTH | ○○○○○<br>●●●●●<br>MALE · FEMALE<br>◇◇◇◇◇<br>◆◆◆◆◆<br>DATE/MONTH/YEAR |
|---|---|---|
| DATA FOR EXTRACTING TASTE FEATURE | OCCUPATION<br>QUALIFICATION<br>HOBBY<br>OBJECT OF INTEREST | △△△△<br>▲▲▲▲▲▲<br>□□□□□<br>■■■■■■ |

```
[ITEM]          :[CONTENT]
NAME            :TARO YAMADA
ID NUMBER       :ABC12345
OCCUPATION      :
QUALIFICATION   :
HOBBY           :
OBJECT OF INTEREST:
```
31a

[OCCUPATION] CHOICES

```
<BROAD CLASSIFICATION>
POLITICS
ECONOMY / INDUSTRY
SCIENCE / LITERATURE
ENTERTAINMENT / SPORT
  :
```
NONE

[OCCUPATION] CHOICES

```
<MEDIUM CLASSIFICATION>
FINANCIER / EXECUTIVE
MANAGERIAL OFFICER
COMPANY EMPLOYEE
PRIVATE SERVICE BUSINESS
  :
```
NONE

```
                                    ┌─31d
[OCCUPATION] CHOICES
  ┌─────────────────────────────┐
  │ ACCOUNTANT                  │
  │ LICENSED TAX ACCOUNTANT     │
  │ INTERPRETER                 │
  │ STENOGRAPHER                │
  │ MANAGEMENT CONSULTANT       │
  │         :                   │
  └─────────────────────────────┘
                          NONE
```

FIG. 5(B)

```
                                    ┌─31e
[ITEM]              : [CONTENT]
NAME                : TARO YAMADA
ID NUMBER           : ABC12345
OCCUPATION          : ACCOUNTANT
QUALIFICATION       :
HOBBY               :
OBJECT OF INTEREST  :
```

FIG. 5(C)

```
[FINAL SCREEN]                      ┌─31f
[ITEM]              : [CONTENT]
NAME                : TARO YAMADA
ID NUMBER           : ABC12345
OCCUPATION          : ACCOUNTANT
QUALIFICATION       : DRIVING LICENSE
                      SOROBAN 1ST CLASS
HOBBY               : DRIVE
                      MOUNTAIN-CLIMBING
OBJECT OF INTEREST  : CAMERA
─────────────────────────────────────
     [OK?]             [YES, NO]
```

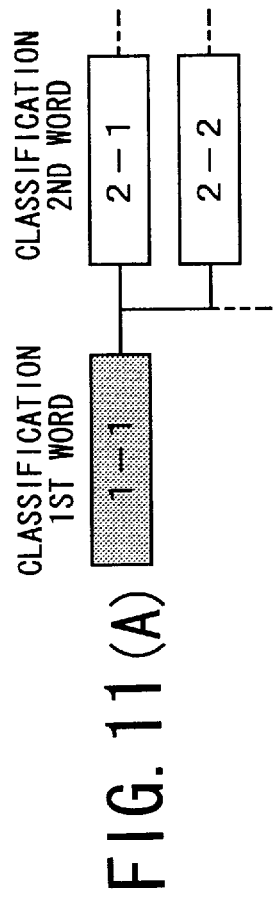
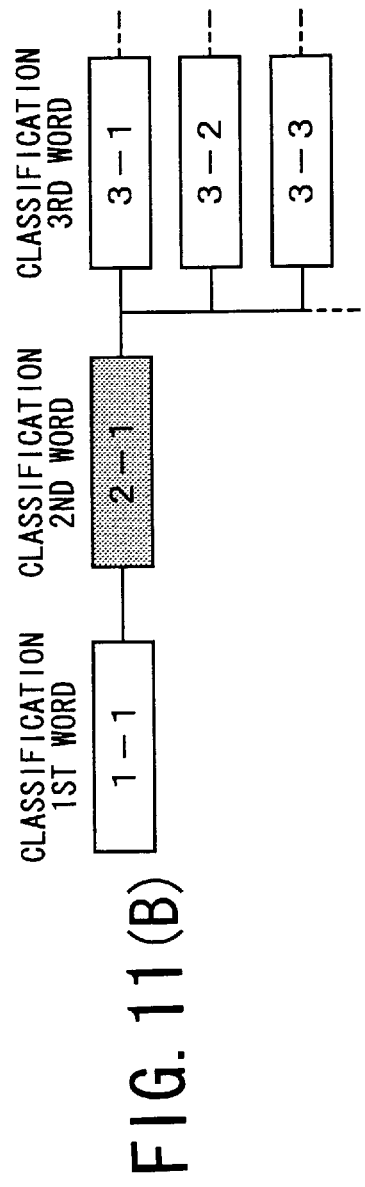
FIG. 11 (A)
FIG. 11 (B)

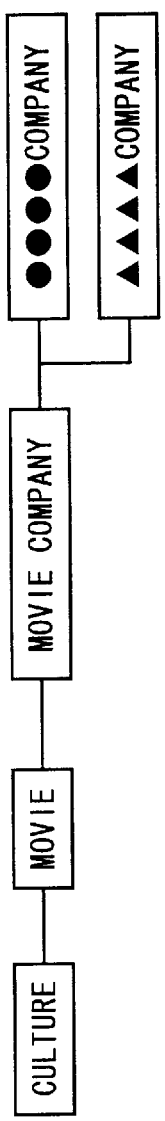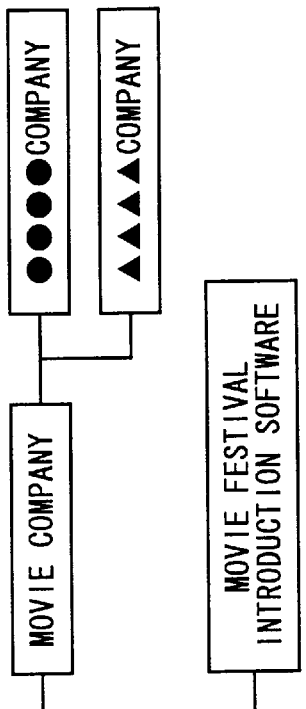
FIG. 18 (A)
FIG. 18 (B)
FIG. 18 (C)

FIG. 23

- SERVICE TITLE : ○○ HOTEL DISCOUNT SERVICE
- DATA NO. : 9507632
- SERVICE CONTENT : IF YOU APPLY FOR A PLAN SUPPLIED BY ○○ HOTEL DURING THE NEXT YEAR (1996), YOU CAN GET VARIOUS DISCOUNTS. ABOUT 5 TO 10 VARIOUS PARTY AND LODGING PLANS ARE SUPPLIED EVERY MONTH.
- QUALIFICATION FOR UTILIZATION : A PERSON WHO USED ○○ HOTEL THIS YEAR
- QUALIFICATION CHECKING METHOD : MAKE A CHECK BY CALLING REFERENCE DESCRIBED BELOW.
- SERVICE FEE : 3000 YEN PER YEAR
- VOLUME OF COLLECTION : 50 PERSONS (IN THE ORDER OF RECEIPT)
- TIME FOR RECEIPT : OCTOBER 1 TO 30, 1995
- SERVICE SUPPLIER : ○○ HOTEL
- REFERENCE : SERVICE PLANNING DEPT., ○○ HOTEL  PERSON IN CHARGE: SATO PHONE NO. 03-3123-4567
- OTHERS : A SPECIAL-PURPOSE PROGRAM IS SUPPLIED TO THE SERVICE USER. THE SUPPLIED PLAN CAN BE RECEIVED BY THIS PROGRAM. THIS SERVICE IS SUPPLIED EVERY YEAR, AND THE AVERAGE DISCOUNT AMOUNT OF USER EXCEEDS 5000 YEN.

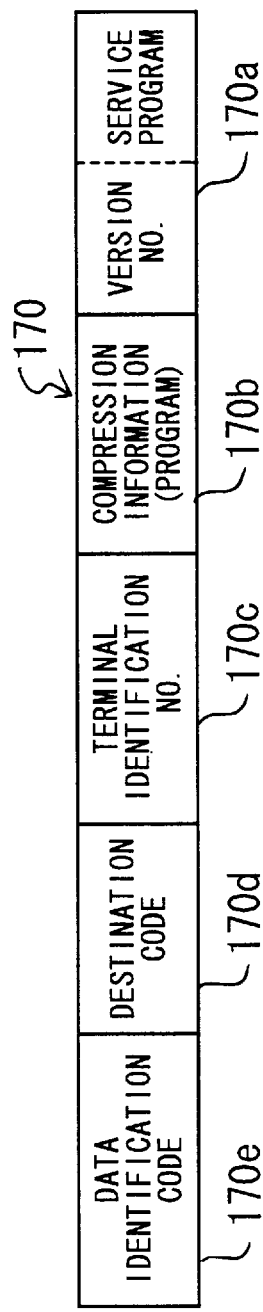
F I G. 38

SERVICE CHANGEABLE SYSTEM AT AN INFORMATION CENTER

BACKGROUND OF THE INVENTION (1). Field of the Invention

The present invention relates to a service changeable system at an infomation center and, more particularly, to a service changeable system at an infomation center, in which a service which a user seems to take an interest in is selected and introduced to a user terminal from an information service center which supplies various services on a network.

In recent years, various kinds of services such as information etc. received through a network have developed. Such a network system is so constituted that a plurality of information providers supplying information are connected to the information center, and the information center is connected to a terminal having communication capability through a network. A user gets access to the information center by using a terminal to receive the supply of necessary information and services.

(2). Description of the Related Art

Conventionally, when a user wants to use a service which is supplied by an information provider etc. through a network, he/she must set an environment which enables the user to search for a usable service by operating a user terminal, and if a desired service is found, he/she can receive the service by changing the terminal function by oneself or by making an application for the service. For example, when the user changes the terminal function, usually, he/she gets a service program stored in an external storage medium, or gets a service program from the information center through a communication line, and installs the service program to a terminal. The application and cancellation of the service are also made by on-line proceedings or by mail etc. between the user and the information center.

However, in the conventional service, when the user desires to receive any service from the information center, the user must change the terminal function by oneself. When the user desires to receive a new service, or when he/she desires to interrupt the service which he/she has already received, the user must make the application or cancellation of the service separately. Further, when the user wants to receive the supply of any service, he/she must find out a service suitable for oneself out of many services, which presents a problem in that much time and troublesome procedure are required for the user to prepare for receiving the service by oneself.

SUMMARY OF THE INVENTION

An object of the present invention is to provide a service changeable system at an information center, in which the information center selects a service which a user seems to be interested in and introduce to the user, and when the user uses the introduced service, an application for the service is made from a user terminal, by which a service program is transmitted.

To achieve the above object, there is provided a service changeable system at an information center, in which the introduction content of a service received from the information center through a communication line is changed according to the user. This service changeable system at an information center comprises profile data registration means for performing a registration processing on receipt of the registration request of user's own profile data from the user terminal; service menu control means for controlling service menu data regarding the menu of services handled by the information center; service menu transmitting means for retrieving the registered profile data and service menu data, selecting a service menu matching the taste of the user, and transmitting the selected menu to the user terminal; and service program transmitting means for receiving an application for the service from the user terminal and transmitting the corresponding service program.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a view showing an example of profile data;

FIGS. 4(A), 4(B) and 4(C) are views showing examples of profile data input screens (Example 1);

FIGS. 5(A), 5(B) and 5(C) are views showing examples of profile data input screens (Example 2);

FIGS. 11(A), 11(B), 11(C) and 11(D) are views showing taste feature patterns;

FIGS. 18(A), 18(B) and 18(C) are views showing examples of patterns of an expanded service menu feature range;

FIG. 23 is a view showing an example of a service menu format;

FIG. 38 is a view showing a data configuration for service program transmission;

DESCRIPTION OF THE PREFERRED EMBODIMENTS

First, the outline of the present invention will be described with reference to the drawings.

Figure 1:
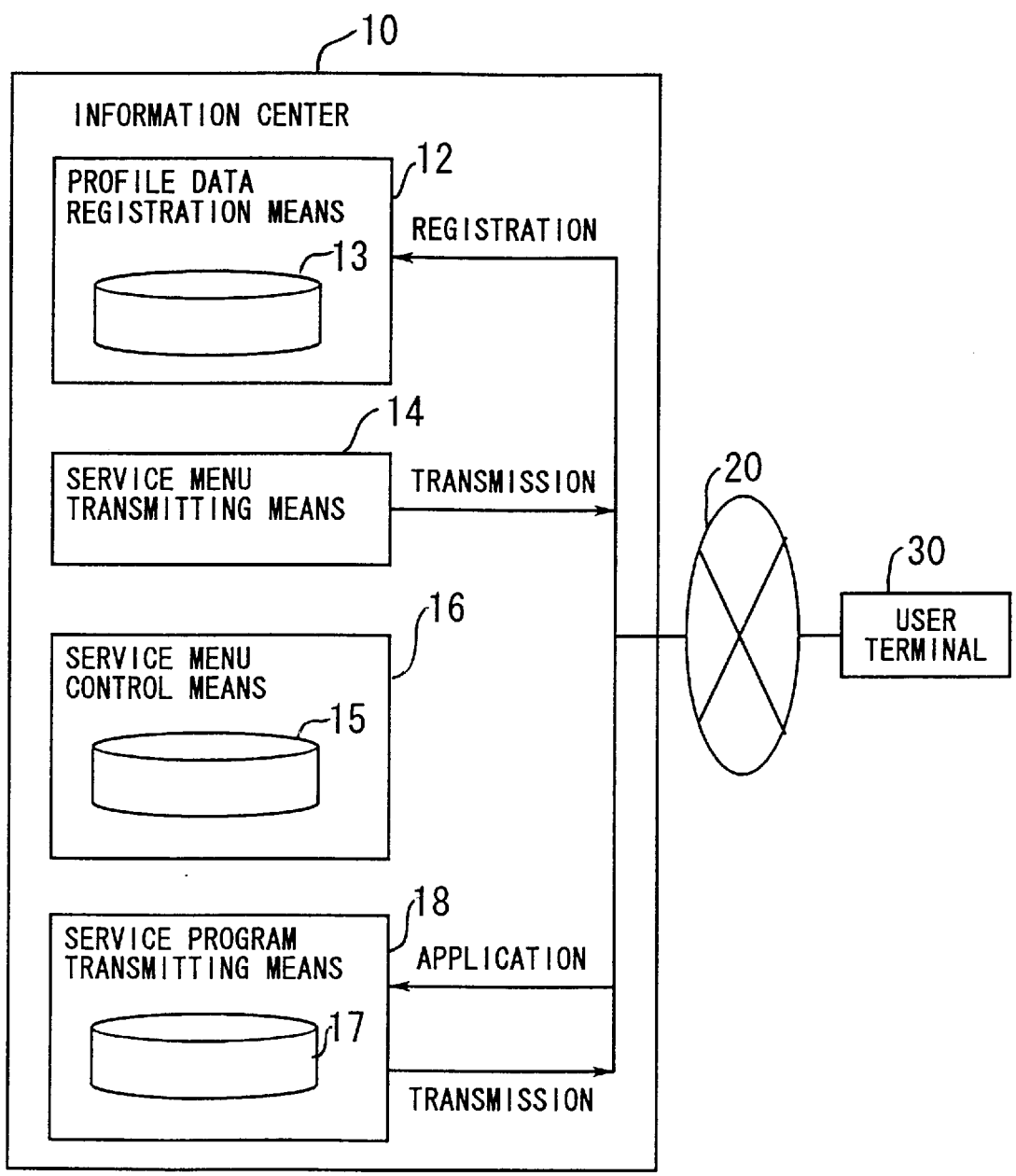
FIG. 1 is a view showing the principle and configuration of a service changeable system at an information center.

FIG. 1 is a view showing the principle and configuration of a service changeable system at an information center.

An information center 10 comprises profile data registration means 12 for registering the profile data of a user, service menu transmitting means 14 for searching the profile data for a service in which the user is interested and for transmitting the corresponding data to a user terminal 30, service menu control means 16 for controlling the service supplied or mediated by the information center 10, and service program transmitting means 18 for transmitting a service program for which an application is made to the user terminal 30 when the application for service is made from the user terminal 30. The profile data registration means 12 has a profile data database 13 for registering the user's profile data in advance, the service menu control means 16 has a service menu database 15 for registering service menu data, and the service program transmitting means 18 has a service program database 17 for controlling a service program, by which the data and service program are controlled.

In the above-mentioned configuration, first, the user registers his/her own profile data beforehand in the profile data registration means 12 of the information center 10 by using the user terminal 30. When a service menu is transmitted, the service menu transmitting means 14 compares the profile data registered in the profile data database 13 with the service menu data registered in the service menu database 15, selects a service in which the user is interested, and transmits the selected service menu data to the user terminal 30. The user reviews the transmitted service menu data at the user terminal 30, and judges whether that service is suitable for his/her desire to receive. If that service is one which the user desires to receive, the user makes an application for that service. At the information center 10, the service program transmitting means 18 receives the application for the service, and transmits a program corresponding to the menu for which the application has been made to the user terminal 30. This program is automatically installed to the user terminal, so that the user can receive the service afterwards.

Next, an embodiment of the present invention will be described below by exemplifying a case where the invention is applied to an information center which mediates between a plurality of information providers and the user terminal.

FIG. 2 is a view showing an example of profile data.

The profile data 130 inputted through the user terminal 30 is received by the profile data registration means 12 of the information center 10, and registered in the profile data database (hereinafter called the database for taste feature members) 13. This profile data 130 comprises "data for identifying user" and "data for extracting taste features".

The "data for identifying user", which is data for identifying the user on the information center side, is used to check whether the user is the correct person or not by making the user input all or part of the data. This "data for identifying user" is data already possessed as member control information on the center side, so that it is found whether the user is the correct person or not by comparing it with the inputted data. The items of this "data for identifying user" include "name", "identification number (ID number)", "sex", "domicile" "telephone number", and "date of birth".

The "data for extracting taste features" includes items such as "occupation", "qualification", "hobby" and "object of interest". This data is used to extract the user's taste from the data inputted in each item, and the taste feature can clearly be found especially from the items of "hobby" and "object of interest".

Figure 3:
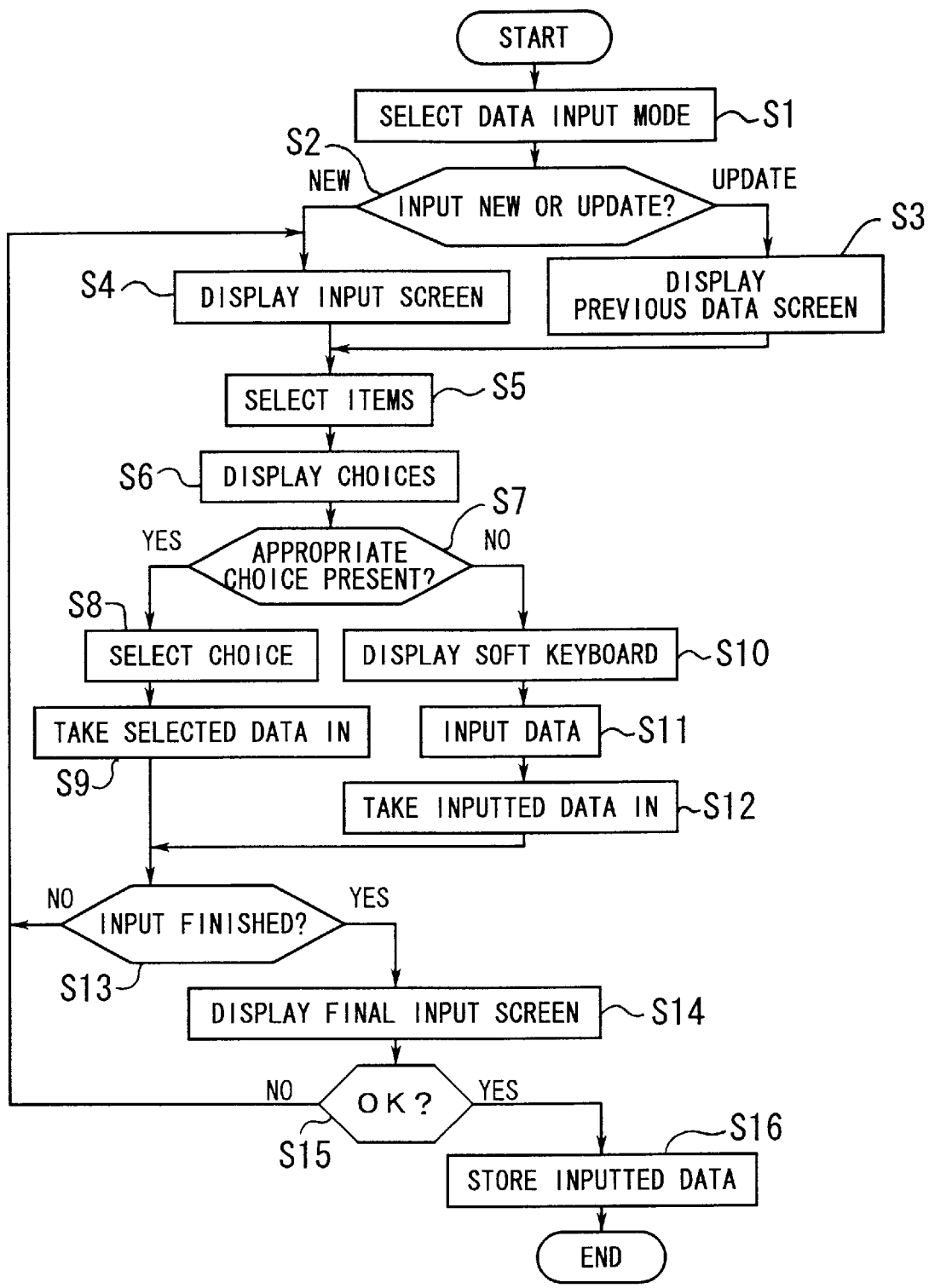
FIG. 3 is a flowchart showing the flow of processing for inputting profile data.
Figure 6:
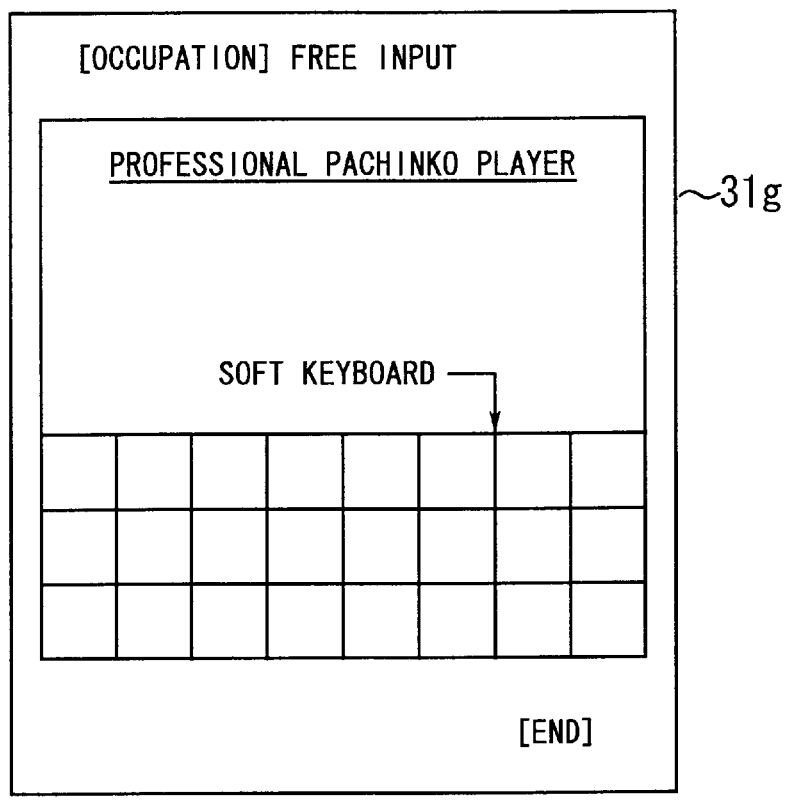
FIG. 6 is a view showing an example of a profile data input screen (Example 3)

FIG. 3 is a flowchart showing the flow of processing for inputting profile data.

When the profile data is inputted, the mode of data input is first selected (Step S1). There is a branch of whether the input is new or updates the previous data (Step S2). If the previous data is still present, necessity for updating is automatically judged, and the previous data is outputted and the input screen is displayed (Step S3). If new data is inputted, the input screen is displayed (Step S4). Then, the user selects items which he/she desires to input on the input screen (Step S5). If one of the items is selected, choices in the item are displayed (Step S6). Here, it is determined whether or not an appropriate choice is present (Step S7). If the appropriate choice is present, it is selected from the displayed choices (Step S8), by which the selected data is taken in (Step S9). If an appropriate choice is absent in the displayed choices, a soft keyboard is displayed (Step S10), and data is inputted by using the soft keyboard (Step S11), by which the inputted data is taken in (Step S12). Then, it is determined whether or not inputting for all items has been finished (Step S13). If the inputting has not been finished, the work process returns to the display of the input screen in Step S4. If the inputting has been finished, a final input screen is displayed (Step S14). Here, the inputted content is checked (Step S15), and the inputted data is stored (Step S16), terminating the work.

FIGS. 4(A), 4(B) and 4(C), FIGS. 5(A), 5(B) and 5(C), and FIG. 6 are views showing examples of profile data input screens. In the case where the previous data is absent and new data is to be inputted when the profile data is inputted, an input screen 31a as shown in FIG. 4(A) is displayed. When item "occupation" is inputted, the item of "occupation" is selected on the input screen 31a. Then, as shown in FIG. 4(B), a selection screen 31b, which displays choices for that item, is displayed. In this example, of the classifications of occupation, broad classifications are listed. If "economy/industry" is selected, for example, from these broad classifications, a selection screen 31c showing choices of medium classification for this item is displayed as shown in FIG. 4(C). Here, if the item of "private service business" is selected, for example, as shown in FIG. 5(A), a selection screen a listing specific occupation is displayed. Here, by selecting "accountant", for example, as shown in FIG. 5 (B), the screen returns to an input screen 31e similar to that shown in FIG. 4(A). On this screen, the selected data "accountant" is displayed in the item of "occupation". After the inputting of each item is finished in such a manner, a final screen 31f to which all items have been inputted is displayed as shown in FIG. 5(C). If this screen 31f is acceptable, "YES" is selected, by which the data on this final screen is transmitted to the information center and stored. If there is no appropriate choice on the selection screen 31b, 31c, or 31d, a free input screen 31g is displayed, and an item is inputted by using the displayed soft keyboard.

Thus, it is possible in most cases for the user to input the data merely by selecting the appropriate choice out of the prepared choices. Therefore, even a user who is unfamiliar with a keyboard and the like can do the input operation. Moreover, when the data is transmitted (registered) to the information center side, only the choice number may be transmitted, so that the capacity of storage memories and communication time can be saved.

Figure 7:
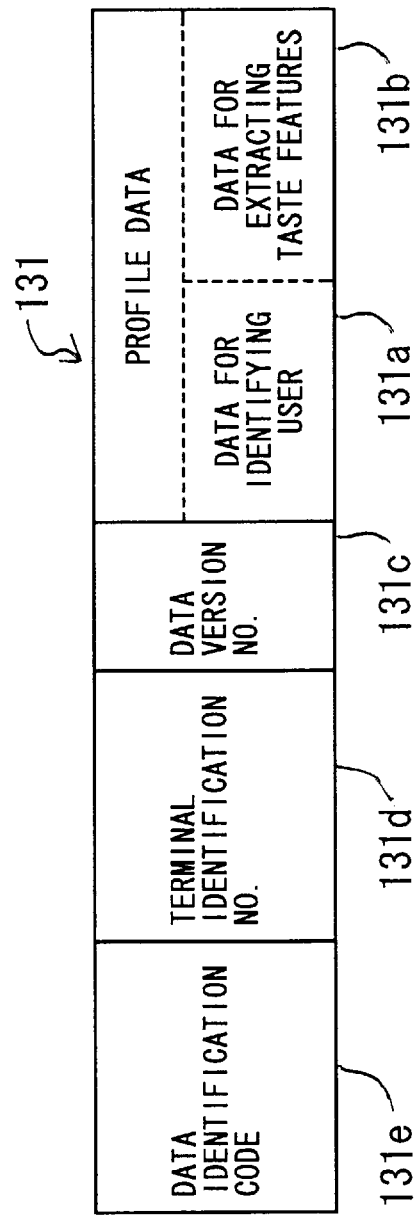
FIG. 7 is a view showing a data configuration when the profile data is transmitted.

FIG. 7 is a view showing a data configuration when the profile data is transmitted.

Transmission data 131 in the case where profile data is registered in the information center has a configuration in which the data version No. and the terminal identification No. of the transmitter are combined with the profile data. The profile data comprises the data for identifying a user 131a and the data for extracting taste features 131b. The data version No. 131c is the version No. of the transmitted profile data. The terminal identification No. 131d is used to check whether the transmitting terminal is a correct one for receiving the service, and to check whether the terminal is the user's own one. Therefore, even if a person intends to register the profile data by using another person's terminal, the information center does not accept the profile data even if the data content is correct. This is a measure, for example, for the case where the user's portable terminal is lost. The data identification code 131e indicates that this data is profile data.

Figure 8:
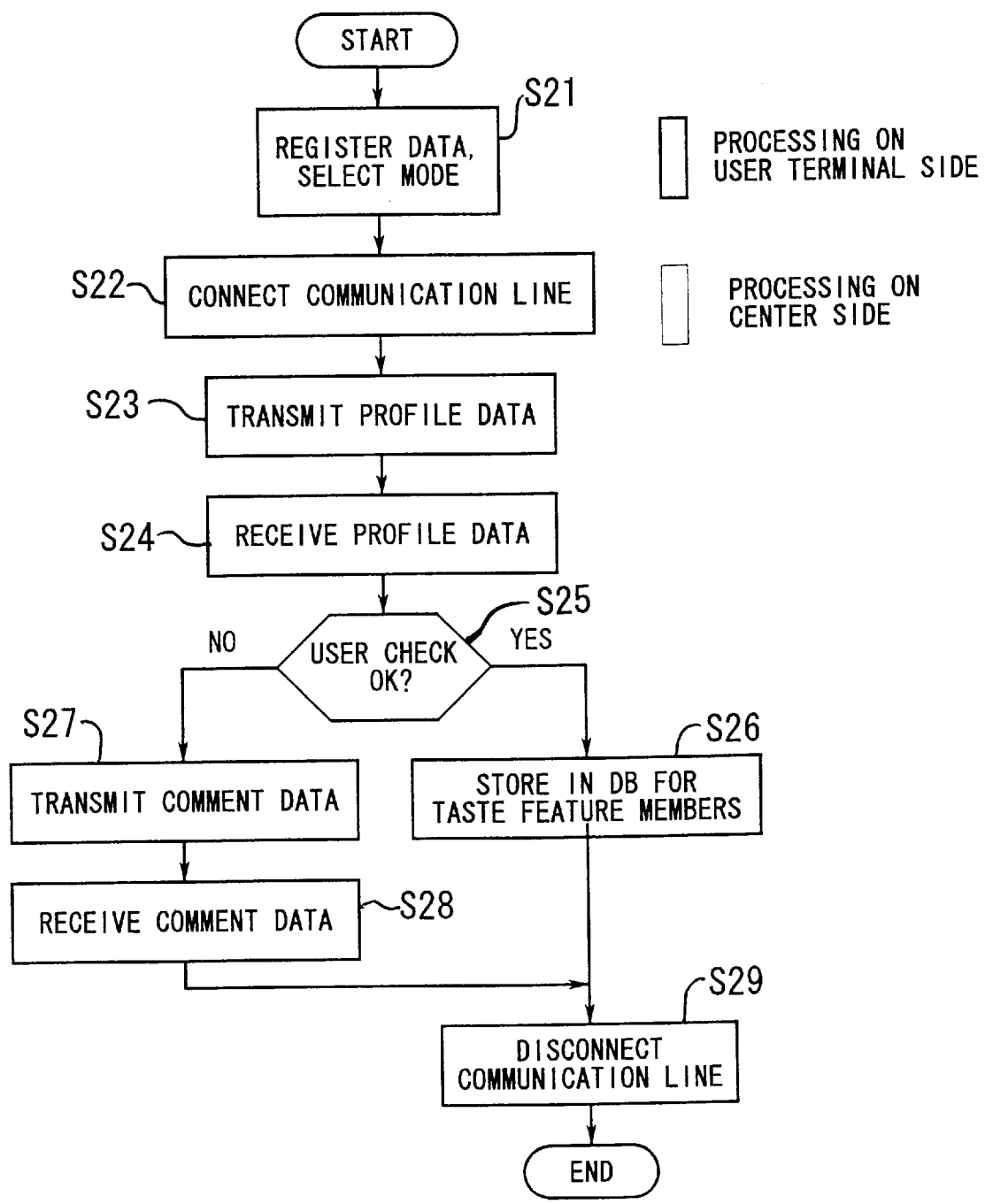
FIG. 8 is a flowchart showing the flow of registration of profile data.

FIG. 8 is a flowchart showing the flow of registration of profile data.

In this flowchart, a box shown with thick solid line indicates the processing on the user terminal side, while a box shown with thin solid line indicates the processing on the information center side. When profile data is registered in the information center, the data is registered at the user terminal, and the mode for transmitting the data is selected (Step S21). Then, the communication line between both sides is connected to each other (Step S22), and the profile data stored in the user terminal is transmitted (Step S23). At the information center, the transmitted profile data is received (Step S24), and check is made to see whether the data is the user's own one (Step S25). If it is confirmed that the user is the correct person, the data is stored in the database (DB) for taste feature members at the information center (Step S26). If the inputted data has an abnormality, the comment data telling that fact is transmitted to the user terminal (Step S27). At the user terminal, the comment data is received (step S28), and the communication line is disconnected (Step S29) to terminate the processing.

Figure 9:
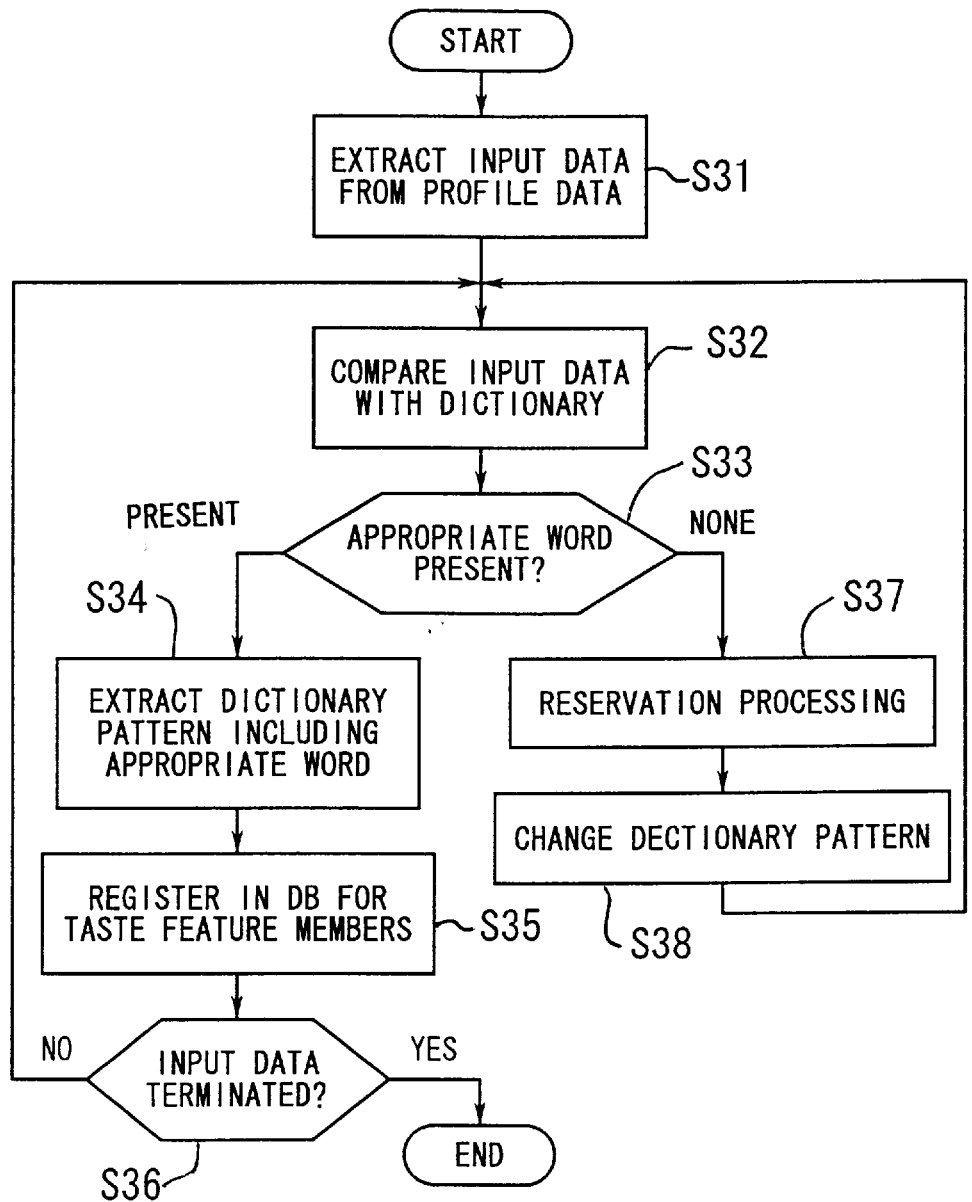
FIG. 9 is a flowchart showing the flow of processing for patternizing taste features.

FIG. 9 is a flowchart showing the flow of processing for patternizing taste features.

Here, from the profile data received by the information center, a taste feature in which the user is interested is extracted. At the information center, the data inputted by the user as profile data is first extracted (Step S31). Then, this input data is compared with a uniquely systematized dictionary (Step S32) to determine whether an appropriate word is present (Step S33). If the appropriate word is present (hit), a dictionary pattern including the appropriate word is extracted (Step S34), and registered in the database for taste feature members corresponding to the user (Step S35). Here, it is determined whether the input data is terminated. If the input data is still present, the processing returns to Step S32. If the input data is absent, the processing is terminated (Step S36). In the determination in Step S33, if an appropriate word is absent, the data is once reserved (Step S37), and the change of the dictionary content (pattern) such as reassembly of the dictionary and addition of data is made on the center side (Step S38). Afterwards, the processing returns to Step S32, where comparison is made again to extract a pattern. The format of the dictionary compared with the input data at this time is described below.

Figure 10:
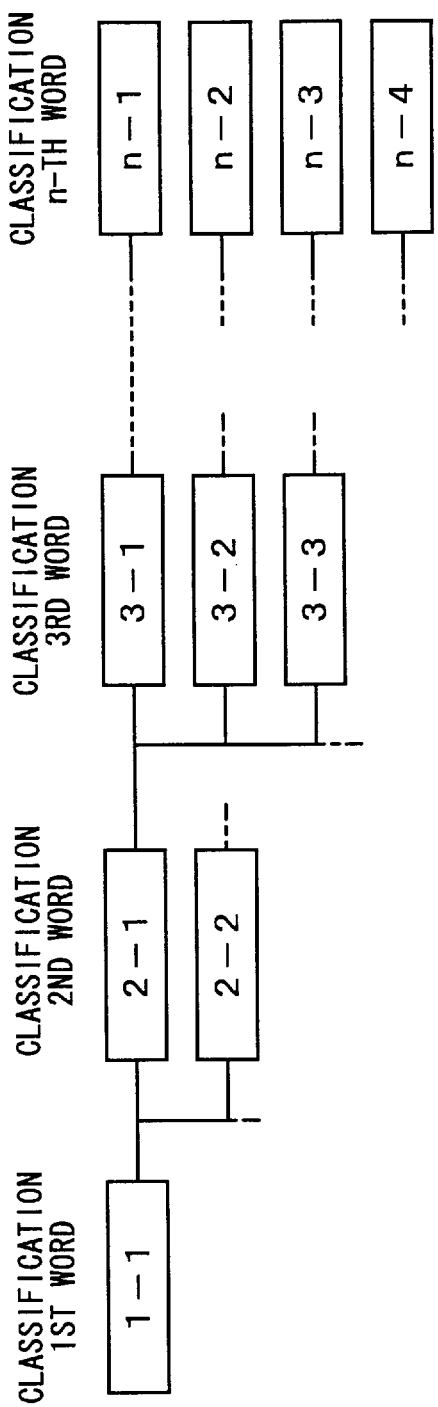
FIG. 10 is a view showing an example of dictionary format.

FIG. 10 is a view showing an example of a dictionary format.

The dictionary compared with the profile data has been prepared in advance on the information center side, being not generated automatically. The connection of words is expressed as a pattern from classification first word to classification n-th word, and the words are connected in a tree shape from broader classification to narrower classification. That is to say, under the broadest classification first word 1-1 are connected narrower classification second words 2-1, 2-2, . . . under which are connected still narrower classification third words 3-1, 3-2, 3-3, . . . , and this way of connection repeats to complete with respect to classification n-th word. In this relationship of word connection, broader classification and narrower classification are represented as higher level and lower level, respectively.

FIGS. 11(A), 11(B), 11(C) and 11(D) are views showing taste feature patterns.

The pattern extracted depending on the classification at which the appropriate word hits, in comparison with the profile data and the dictionary, will be described below by showing four examples.

Figure 11C:
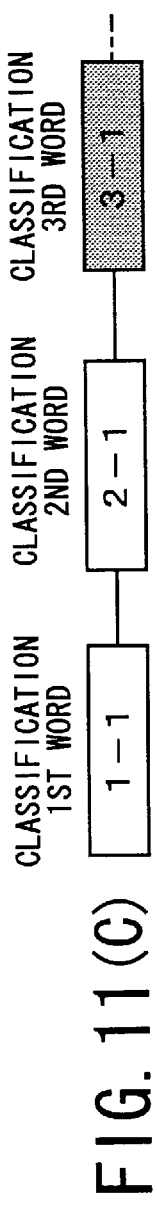
Figure 11D:
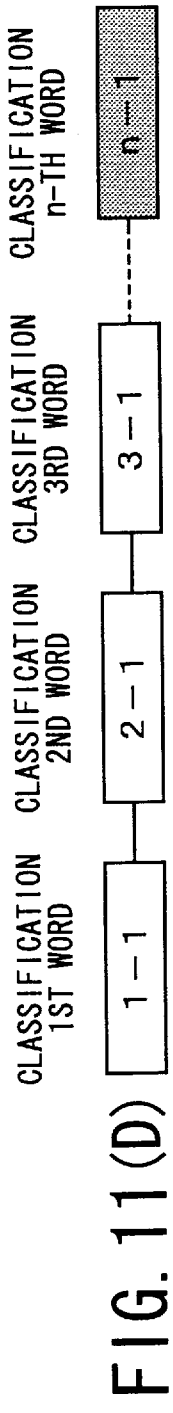

As shown in FIG. 11(A), if data hits at a classification first word 1-1, all words connected to the classification first word 1-1 are taken in to be patternized. As shown in FIG. 11(B), if data hits at classification second word 2-1, the higher level a classification first word 1-1 and all lower level words connected to this classification second word 2-1 are taken in to be patternized. As shown in FIG. 11 (C), if data hits at classification third word 3-1, the higher level two words, classification second word 2-1 and classification first word 1-1, and all lower level words connected to this classification third word 3-1 are taken in. As shown in FIG. 11(D), data hits at classification n-th word n-1, all higher level words are taken in. Thus, for lower level classification, a direct simple pattern is used. At this time, if data hits at extremely high level classification word, the number of extracted words becomes large, and the pattern is enlarged. Therefore, the patternizing range should be desirable to be set in advance to make a pattern in this range.

Figure 12:
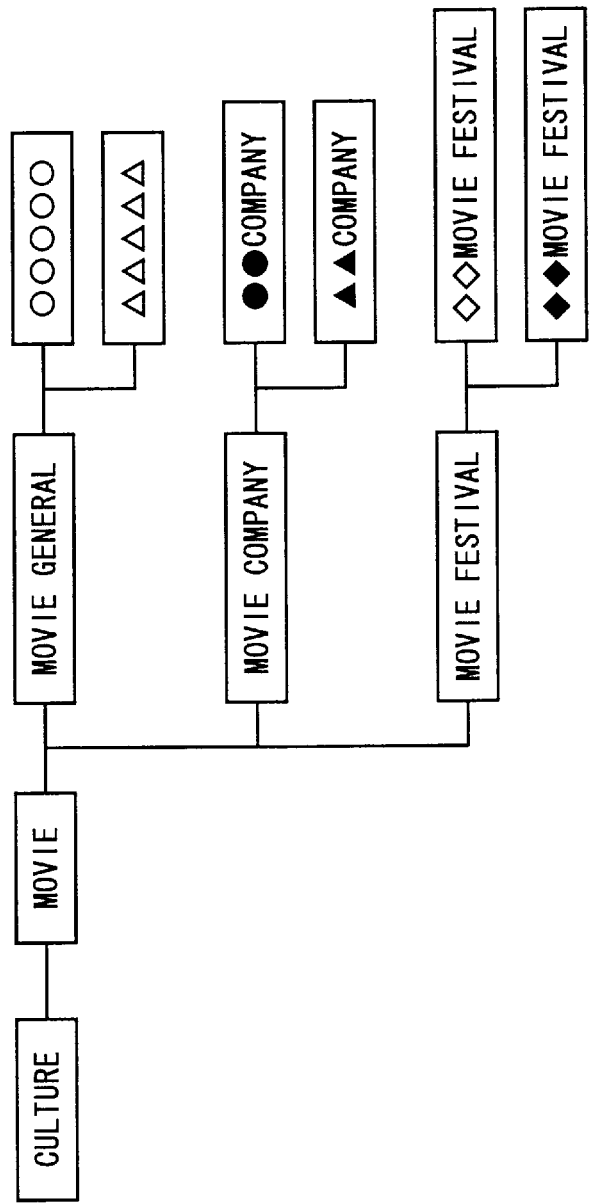
FIG. 12 is a view showing an example of a specific pattern of extracted taste features.

FIG. 12 is a view showing an example of a specific pattern of extracted taste features.

This example shows a case where the classification second word "movie" is hit and extracted. In this case, a pattern including the direct higher level word "culture", the words belonging to "movie" at the lower level, "movie general", "movie company", and "movie festival", and the words belonging to these words, is extracted. Here, the pattern range is up to classification fourth word. By patternizing taste features in such a manner, the hitting percentage is increased, so that the number of data introduced to the user is increased in comparison with the case where data is represented by words. For example, in the example shown in FIG. 12, when the taste feature data of the user is "movie", if words are used, the data is not introduced unless "movie" itself is hit, but if patterns are used, the data relating to "movie" ranging from "culture" to "movie general", "movie company", "movie festival", etc. is introduced.

FIGS. 13 to 16 are views showing examples of configuration of a database for taste feature members.

These figures show databases indicating taste features each user has. Four configurations of database are possible. By using each database, the service menu in which the user is interested is retrieved to introduce the data to the user.

Figure 13:
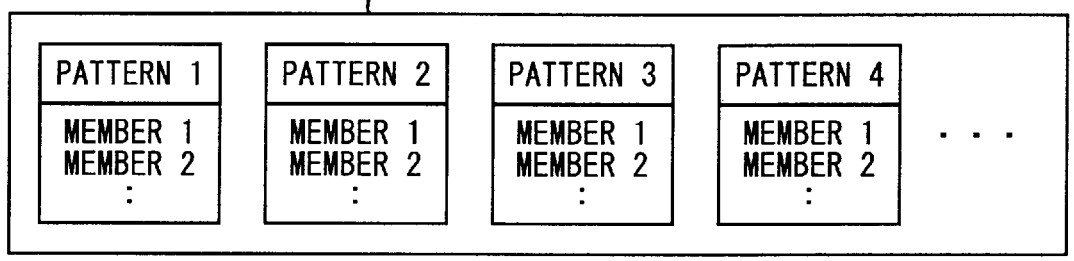
FIG. 13 is a view showing an example of a configuration of a database for taste feature members (Example 1)

The database for taste feature members 13a shown in FIG. 13 shows a configuration in which the users correspond to each patternized taste feature. According to the configuration in which the identification number of the user corresponds to each pattern, there is provided features that the number of transmissions can be known immediately for each pattern and that the members for each pattern can be known easily.

Figure 14:
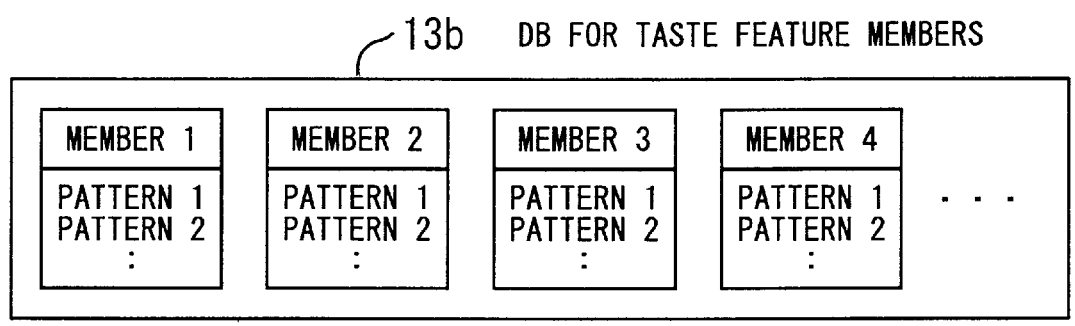
FIG. 14 is a view showing an example of a configuration of a database for taste feature members (Example 2)

The database for taste feature members 13b shown in FIG. 14 shows a configuration in which the patternized taste features correspond to each user. The configuration in which the patternized taste feature corresponds to each identification number of the user is convenient, for example, when it is desired to know what taste feature a particular user has.

Figure 15:
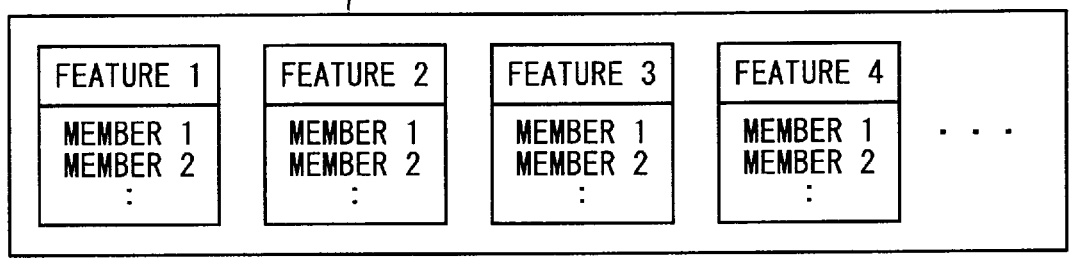
FIG. 15 is a view showing an example of a configuration of a database for taste feature members (Example 3)

The database for taste feature members 13c shown in FIG. 15 shows a case where the taste feature is not patternized. It shows a configuration in which the users correspond to each taste feature. This configuration has, as shown in FIG. 13, features that the number of transmissions can be known immediately, and that the members for each taste feature, that is, the names of members having a taste feature of, for example, "movie" can be known easily.

Figure 16:
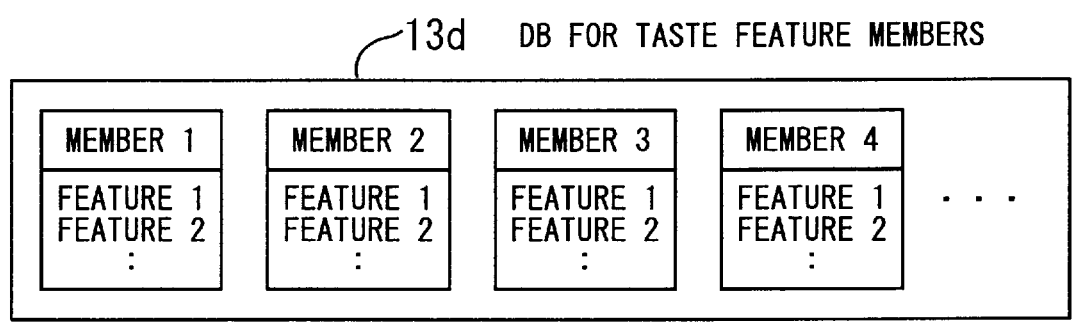
FIG. 16 is a view showing an example of a configuration of a database for taste feature members (Example 4)

The database for taste feature members 13d shown in FIG. 16 also shows a case where the taste feature is not patternized. It shows a configuration in which the taste features correspond to each user. As shown in FIG. 14, this configuration is convenient when it is desired to know what taste features the particular user has.

Of the databases for taste feature members 13a to 13d shown in FIGS. 13 to 16, respectively, the configuration which should be used depends on the operation method of information center and the necessity. However, from the viewpoint of users, when many kinds of service menu to be introduced are desired, the use of the databases for taste feature members 13a and 13b in which the taste features are patternized is preferable. Meanwhile, when limited data is desired to be introduced, the use of the databases for taste feature members 13c and 13d in which the taste features are not patternized is preferable.

Although "pattern", "feature", and "member" are described in the figures, the word number on the dictionary and the member's number are used as the actual data.

Figure 17:
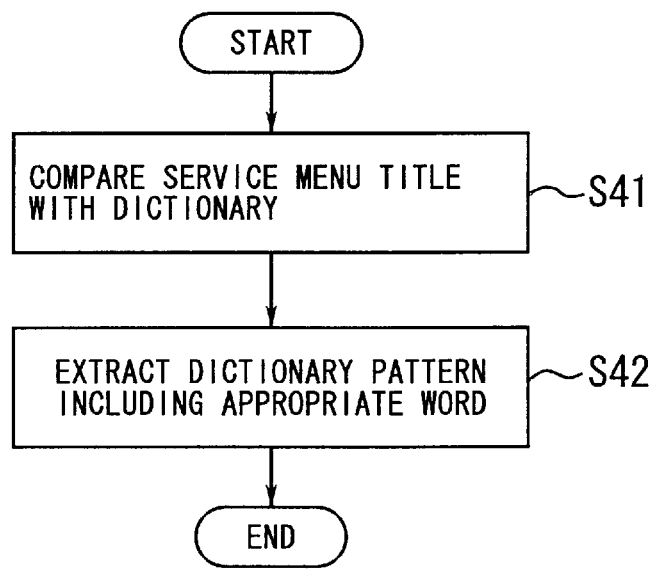
FIG. 17 is a flowchart showing the flow of processing for making a service menu pattern.

FIG. 17 is a flowchart showing the flow of processing for making a service menu pattern.

The service menu is stored in the service menu database. When a new service menu is added to this, a service menu pattern is made. In this case, the title (feature) of service menu is compared with the dictionary shown in FIG. 10 (Step S41). If the appropriate word is found (hit), the dictionary pattern including the appropriate word is extracted (step S42).

The pattern format of the title (feature) of the service menu is the same as the pattern format of the taste feature shown in FIG. 11.

The patternizing of the service menu is different from the patternizing of the taste features shown in FIG. 9, in that data always hit when being compared with the dictionary because titling for the service menu is made by using words presenting in the dictionary. If a word which is not present in the dictionary is desired to be used by all means, the word may be added to the dictionary. Basically, only when the service menu is introduced, patternizing is done, so that the service menu need not be stored as a database. Therefore, since the number is smaller than that of the taste features, the range of patternizing is not determined. That is to say, even if the data hits at any classification level, the pattern is taken in up to the final word.

FIG. 18 is a view showing an example of pattern of expanded service menu feature range.

For example, as shown in FIG. 18(A), it is assumed that there is a taste feature pattern in which the taste feature data "movie company" of the user is patternized. Here, as an example, it is assumed that a service menu titled "movie festival introduction software", which can see various movie festivals, is newly added. The feature (title) of this service menu is added to the dictionary. At this time, this feature is added as a lower level word which is one level lower than "movie". In this case, to a person who hits at "movie company", "movie festival introduction software" is not introduced naturally. However, there is a high possibility that a person who is interested in movie companies is also interested in movie festivals, so that it is useful to expand the introduction range up to such a feature.

The features of service menu are patternized by the feature "movie festival introduction software" of the service menu as shown in FIG. 18(B). By doing patternizing in comparison (retrieval) with the service menu feature pattern, which has been patternized as described above, with the taste feature pattern, a feature included in the taste feature pattern is newly included. Thereby, the number of service menu introduced to the user is increased, so that many kinds of menu can be introduced to a person who does not hit from the profile data only.

Next, how the database for taste feature members, which is prepared from the profile data, is retrieved will be described by exemplifying a case where the service menu is a pattern form and the database is the database for taste feature members 13a shown in FIG. 13.

Figure 19:
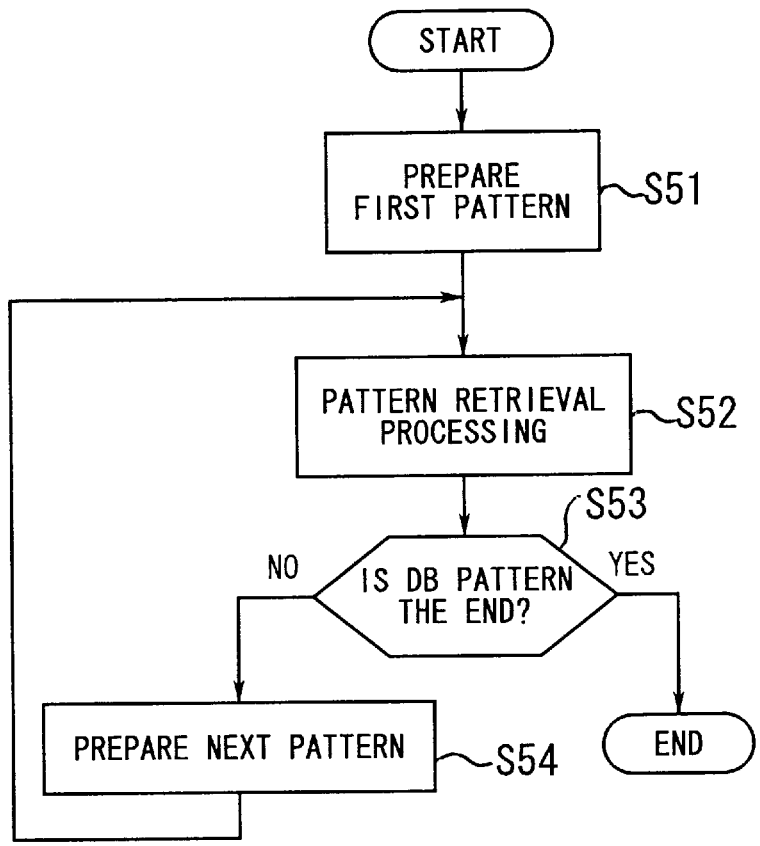
FIG. 19 is a flowchart showing the flow of basic processing for retrieval of a database for taste feature members.

FIG. 19 is a flowchart showing the flow of a basic processing for retrieval of a database for taste feature members.

To retrieve the database for taste feature members, a first pattern is first prepared (Step S51), and the pattern retrieval processing is performed for that pattern (Step S52). The details of the pattern retrieval processing will be explained in FIG. 20. After the pattern retrieval processing is finished, it is determined whether the pattern of database is the end (Step S53). If it is the end, this basic processing terminates. If it is not the end, the next pattern is prepared (Step S54) and the processing returns to Step S52. This retrieval processing is carried out at certain time intervals, for example, every one month.

Figure 20:
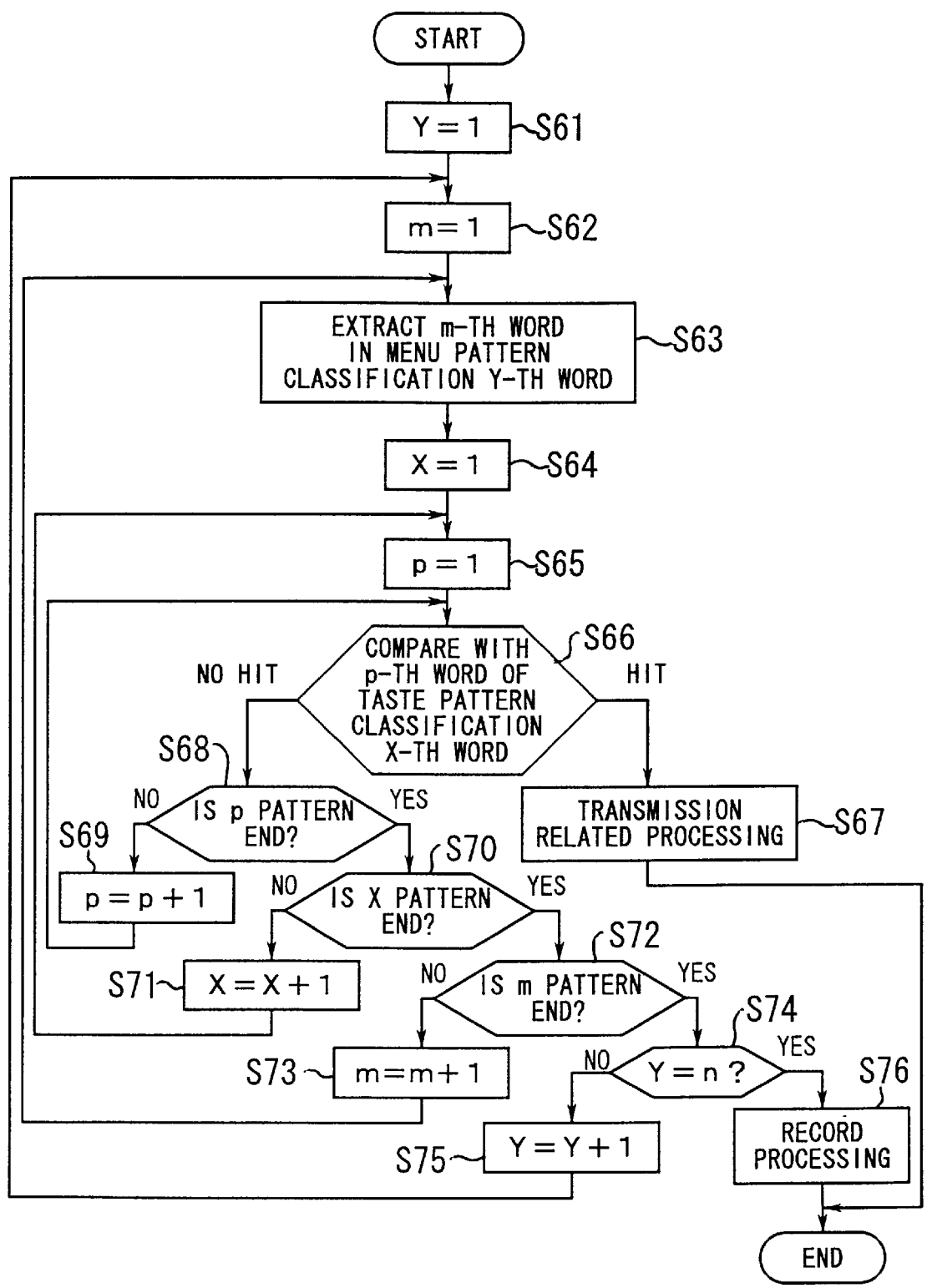
FIG. 20 is a flowchart showing the flow of pattern retrieval processing of a database for taste feature members.

FIG. 20 is a flowchart showing the flow of a pattern retrieval processing of a database for taste feature members.

In the processing of pattern retrieval, initialization is first made to determine from what classification word (level) of the menu pattern the retrieval is to be started (Step S61). Usually, "Y=1" is set so that the retrieval is started from the classification first word of the highest level. Similarly, initialization is made to determine from what word of that classification word the retrieval is started (Step S62). Usually, "m=1" is set so that the retrieval is started from the beginning. Next, the m-th word of the menu pattern classification Y-th word is extracted (Step S63). Here, initialization is made to determine from what classification word of the taste pattern the retrieval is to be started (Step S64). Usually, "X=1" is set so that the retrieval is started from the classification first word of the highest level. Similarly, initialization is made to determine from what word of that classification word the retrieval is started (Step S65). Usually, "p=1" is set so that the retrieval is started from the beginning. Then, the extracted word is compared with the p-th word of the taste pattern classification X-th word (Step S66). As a result of comparison, if they agree with each other, that is, the extracted word hits, transmission related processing is carried out (Step S67), terminating the processing. The transmission related processing will be described later with reference to FIG. 21.

In Step S66, the extracted word does not hit, it is determined whether p is the end of the pattern (Step S68). If it is not the end, p is increased one to compare with the next word (Step S69), and the processing returns to Step S66. In Step S68, if p is the pattern end, it is determined whether X is the end of the pattern (Step S70). If it is not the end, X is increased one to make comparison with the next word (Step S71), and the processing returns to Step S65. In Step S70, if X is the pattern end, it is determined whether m is the end of the pattern (Step S72). If it is not the end, m is increased one to make comparison with the next word (Step S73), and the processing returns to Step S63. In Step S72, if m is the pattern end, it is determined whether Y is pattern range n (Step S74). If Y is not equal to n, Y is increased one to make comparison with the next word (Step S75), and the processing returns to Step S62. In Step S74, if Y=n, a record telling that no word hits any words is made (Step S76), terminating the processing.

Figure 21:
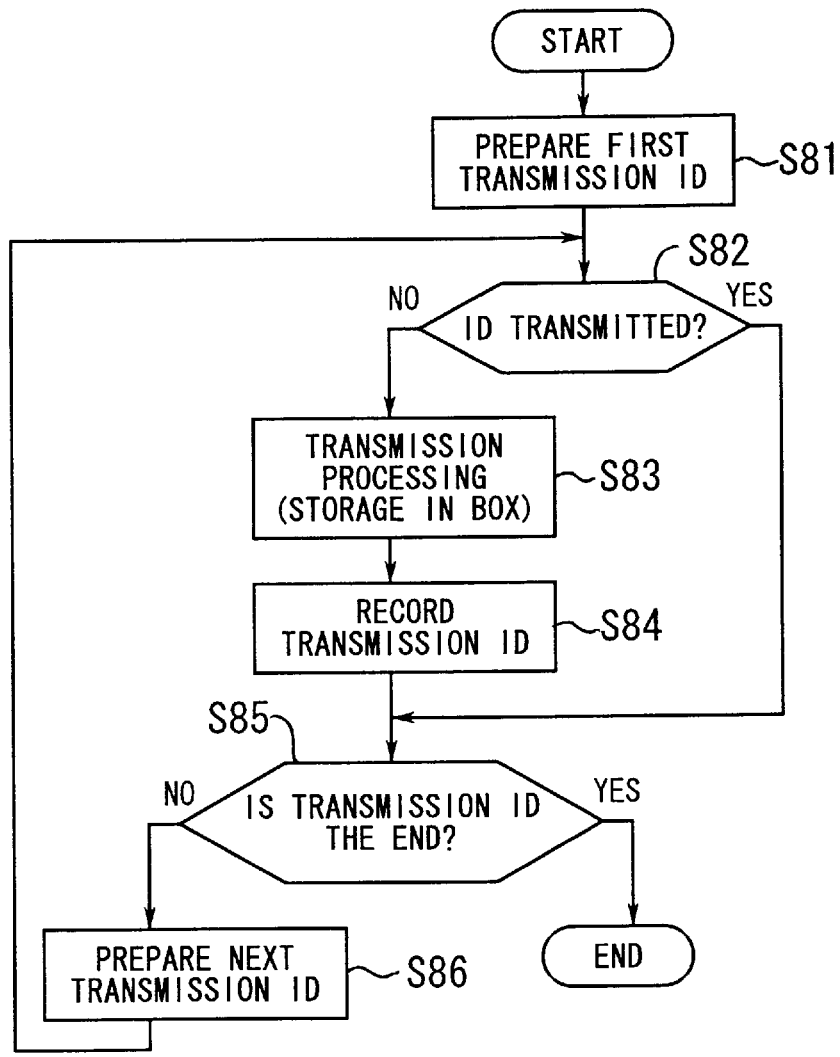
FIG. 21 is a flowchart showing the flow of a transmission related processing of a database for taste feature members.

FIG. 21 is a flowchart showing the flow of transmission related processing of database for taste feature members.

The database for taste feature members is retrieved for each pattern, and if there is a hit, the number of the corresponding member (called transmission ID) is prepared (Step S81). It is checked whether that transmission ID has been transmitted (Step S82). If transmitted, the transmission processing is done (Step S83), and a record is made to prevent the once transmitted transmission ID from being transmitted doubly (Step S84). Here, the transmission processing means processing for storing the transmission ID in a memory (box) prepared for each user, and the storage of the transmission ID in a box is called transmission. Next, it is determined whether the transmission ID is the end (Step S85). If it is not the end, the next transmission ID is prepared (Step S86), and the processing returns to Step S82. In the determination in Step S85, if the transmission ID is the end, this transmission processing terminates.

As described above, when the service menu is of a pattern form and the database is a database for taste feature members 13a, retrieval is performed for each pattern, and if there is a hit, transmission is performed to the corresponding ID. Similarly, when the service menu is of a pattern form and the database is a database for taste feature members 13b of a form shown in FIG. 14, the pattern corresponding to each ID is retrieved, and if there is a hit, transmission is performed to that ID at that time, and then the retrieval of the pattern corresponding to the next ID is started. When the service menu is of a pattern form and the database is a database for taste feature members 13c of a form shown in FIG. 15, retrieval is performed for each feature, and if there is a hit, transmission is performed to the corresponding ID. When the service menu is of a pattern form and the database is a database for taste feature members 13d of a form shown in FIG. 16, the corresponding feature word is retrieved for each ID, and if there is a hit, transmission is performed to that ID at that time, and then the retrieval of the feature word corresponding to the next ID is started. When the service menu is of a word form and the database is a database for taste feature members 13a of a form shown in FIG. 13, retrieval is performed for each pattern, and if there is a hit, transmission is performed to the corresponding ID. When the service menu is of a word form and the database is a database for taste feature members 13b of a form shown in FIG. 14, the corresponding pattern is retrieved for each ID, and if there is a hit, transmission is performed to that ID at that time, and then the retrieval of the pattern corresponding to the next ID is started.

In the database for taste feature members, if both of the service menu and the taste feature are patternized, the hit percentage is naturally high. However, when only particular data is desired to be introduced, the number of hit data becomes too large. It is desirable to determine what method should be used, by both the information center side and the user.

Next, various services are introduced to the user by the service menu prepared from the profile data. The introduced service includes a service which can be used by the user and a service which cannot be used by the user. It is wasteful to introduce a service which cannot be used by the user. Therefore, the system can be so designed that the qualification for the service utilization is checked before the transmission of service menu.

Figure 22:
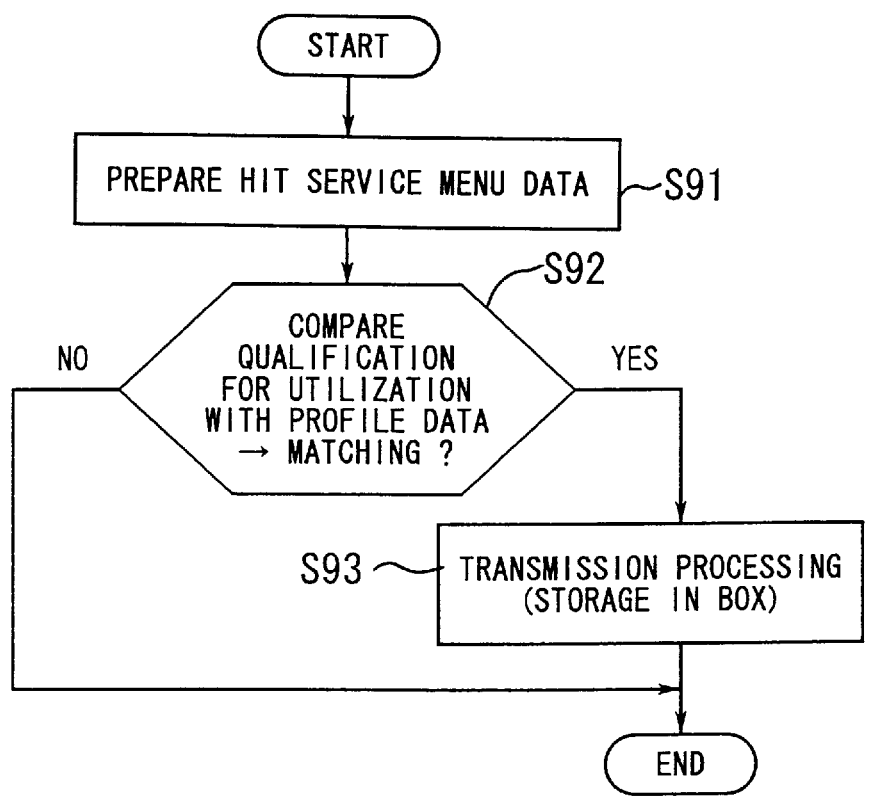
FIG. 22 is a flowchart showing the flow of checking the qualification for service utilization.

FIG. 22 is a flowchart showing the flow of checking the qualification for service utilization.

In checking the qualification for service utilization, the hit service menu data is first prepared (Step S91). The qualification for utilization defined in the service is compared with the profile data, and it is determined whether there is an agreement (Step S92). Only when an agreement is found, transmission processing is done (Step S93).

The service menu includes a service title and data No. When a qualification for utilization has been defined for these items, the service menu is not introduced to the user who does not have this qualification by the aforementioned check processing even if the service menu is hit by retrieval. The qualification for service utilization may include occupation and particular organization member. Also, the qualification can be given according to the member level (if there is ranking). For example, when there is an information supply service of A college, this service is limited to the students of A college and the personnel concerned. The qualification for service utilization is given to the students of A college and the personnel concerned.

FIG. 23 is a view showing an example of a service menu format.

The service menu 150 includes items such as service title, data No., and service content. By describing "qualification for utilization" and its "checking method" in addition to these items, a check can be made in the application on the user side, separately from the above-described processing for checking the qualification for service utilization shown in FIG. 22. For example, if there is a qualification for utilization of "20 to 30 years old", this qualification can be checked from the profile data on the information center side by the processing shown in FIG. 22, but a qualification of, for example, "person who used ○ ○ Hotel", which is not described in the profile data, can be understood by the user only. In such a case, the qualification is judged by the user after the service menu 150 is transmitted to the user.

Next, another processing example in the case where there is no hit as a result of the retrieval of database for taste feature members will be described.

Figure 24:
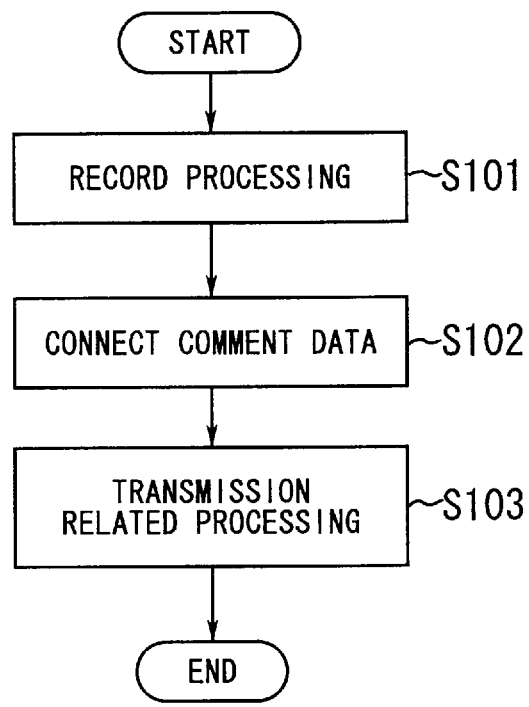
FIG. 24 is a flowchart showing the flow of a transmission processing when there is no hit.

FIG. 24 is a flowchart showing the flow of a transmission processing when there is no hit.

When there is no hit feature of service menu as a result of the retrieval of database for taste feature members, the record processing is done and the processing is terminated in the processing shown in FIG. 20, but there is sometimes a desire for transmitting (introducing) any data. To respond to such a case, a record processing is first done (Step S101), comment data is connected (Step S102), and then the transmission related processing is done for all users (Step S103). The transmission related processing is performed by using the flowchart shown in FIG. 21. The comment includes a description of the fact that introduction is made to all members or a description of the fact that introduction is specially made to respective users though not suitable to the taste.

Figure 25:
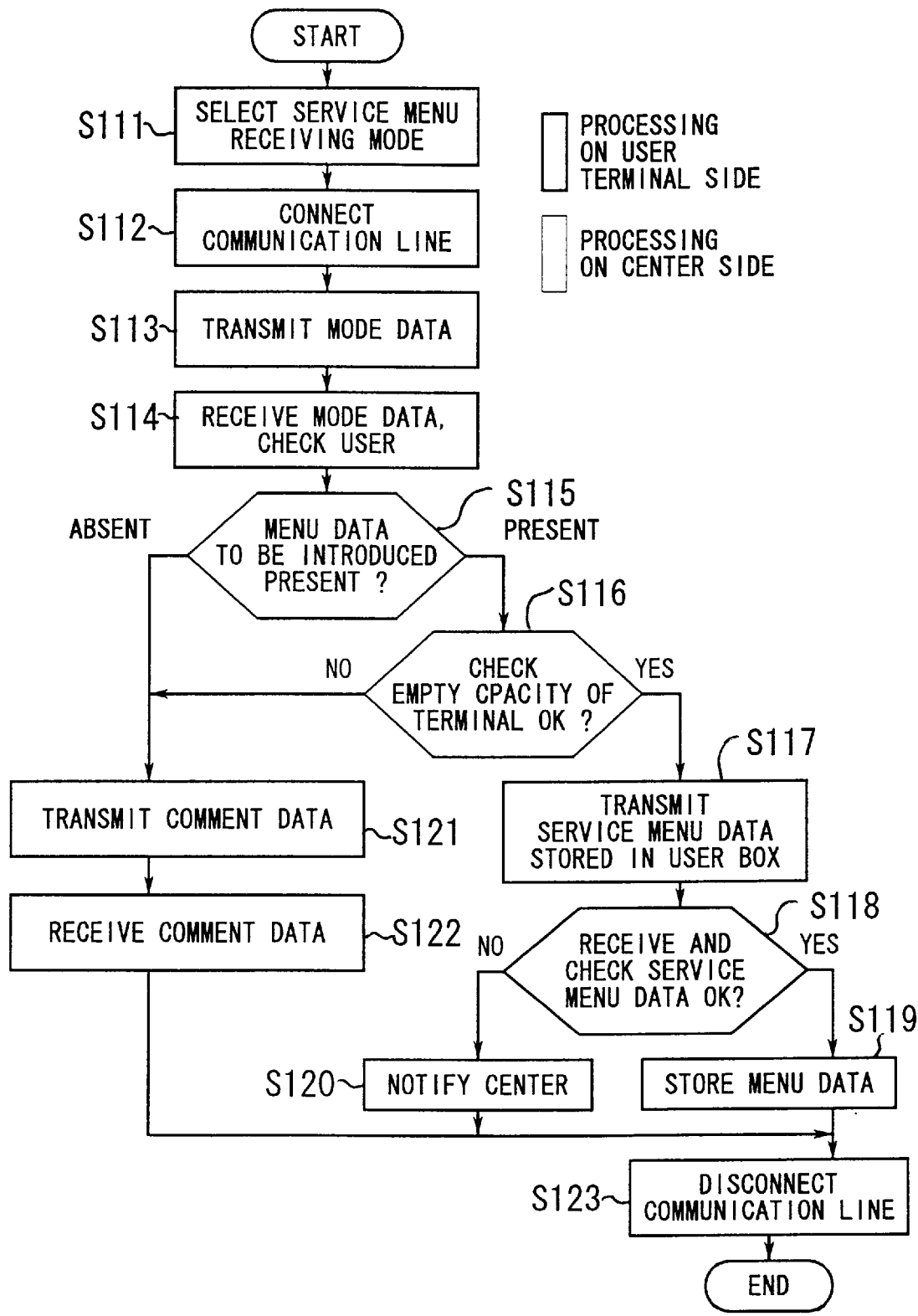
FIG. 25 is a flowchart showing the flow of an ordinary transmission processing of a service menu.

FIG. 25 is a flowchart showing the flow of ordinary transmission processing of service menu.

Although the storage of data in the user box, that is, in the memory prepared for each user at the information center, has been called transmission in the above description, hereinafter the sending of data from the user box to the user terminal is formally called transmission. In this flowchart, a box shown with thick solid line indicates a processing on the user terminal side, and a box shown with thin solid line indicates a processing on the information center side.

First, at the user terminal, a mode for receiving service menu is selected (Step S111), a communication line is connected (Step S112), and the mode data is transmitted to the information center (Step S113). At the information center, the mode data for receiving the service menu is received from the user terminal and the processing for checking the user is done (Step S114), and then it is determined whether there is menu data to be introduced from the information center (Step S115). If there is the menu data to be introduced, check is made to see whether the empty capacity of the user terminal is sufficient (Step S116). If the check result is OK, the service menu stored in the user box is transmitted to the user terminal (Step S117). At the user terminal, the receiving of the service menu data is checked (Step S118). If the check result is OK, the service menu data is stored in the user terminal (Step S119). If the check cannot be made, the information center is notified of that fact (Step S120). If there is no service menu to be introduced in Step S115, or if it is judged that the empty capacity of the user terminal is not sufficient in Step S116, the information center sends comment data according to individual case (Step S121). At the user terminal, the comment data is received (Step S122).

Finally, the communication line is disconnected (Step S123) to terminate the processing.

Figure 26:
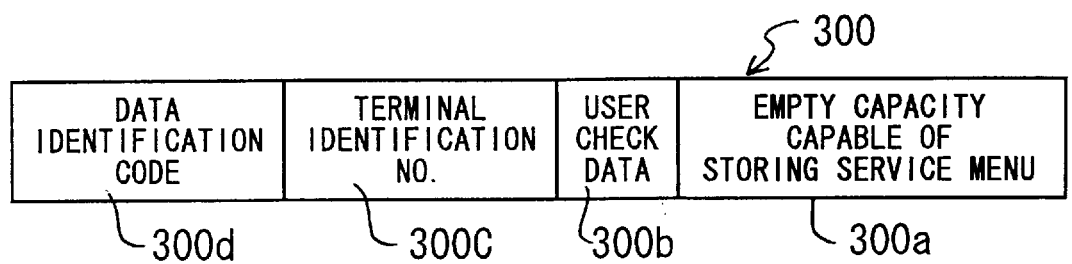
FIG. 26 is a view showing a data configuration of a service menu receiving mode.

FIG. 26 is a view showing a data configuration of a service menu receiving mode.

The data 300 of the service menu receiving mode transmitted from the user terminal to the information center includes an empty capacity capable of storing service menu 300a, user check data 300b, terminal identification number 300c, and data identification code 300d. The terminal identification number 300c and the user check data 300b such as an ID number are used to check the user. The empty capacity capable of storing the service menu 300a is a data indicating the empty capacity of the terminal. The data identification code 300d indicates that this data is the data of the service menu receiving mode. The service menu data stored in the terminal is read by the user and subjected to a judgment processing (marking) to judge whether it is desired by the user, and then the unnecessary data is deleted. The data judged to be necessary is deleted when the applied service program is transmitted.

Figure 27:
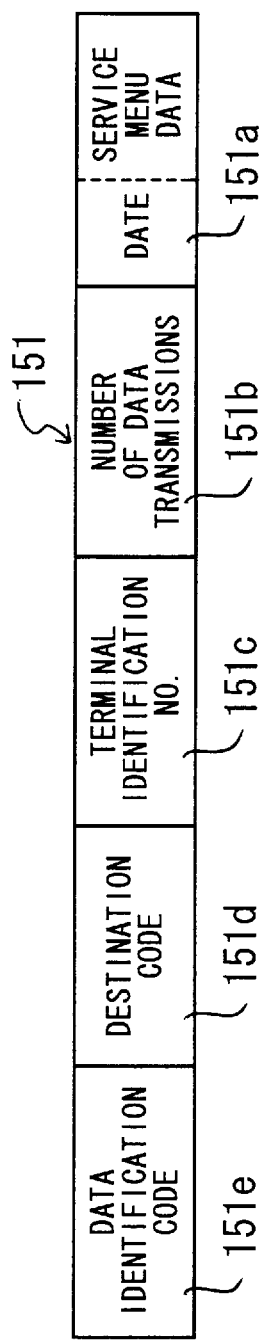
FIG. 27 is a view showing a data configuration for a service menu transmission.

FIG. 27 is a view showing a data configuration for service menu transmission.

The data 151 for service menu transmission, which is transmitted from the information center to the user terminal, comprises service menu data 151a including date, the number of data transmission 151b, a terminal identification number 151c, destination code 151d, and a data identification code 151e. The information center transmits data to the user terminal according to the destination code 151d, and on the terminal side, it is judged whether the data has been sent to that terminal by using the terminal identification number 151c. As shown in Step S120 in FIG. 25, when the data has not been sent to that terminal or when a fault occurs in receiving data, the information center is informed of that fact. When the receiving of data can be identified, the received menu data is stored. The number of data transmission is provided to tell the terminal side how many menus have been sent.

The processing at the user terminal when the user selects a desirable service from the service menu thus transmitted will be described below.

Figure 28:
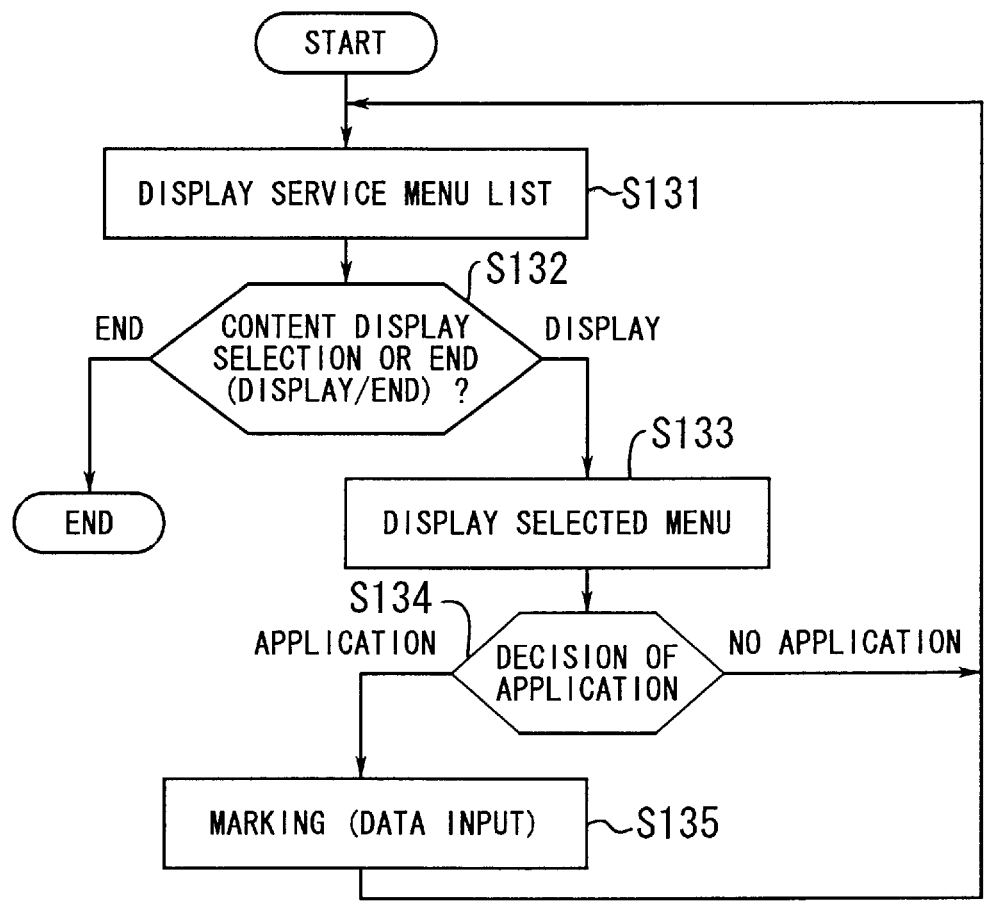
FIG. 28 is a flowchart showing the flow of a processing for selecting a service for which an application is desired to be made at a user terminal.

FIG. 28 is a flowchart showing the flow of processing at the user terminal for selecting a service for which the user wishes to make an application.

When the user selects a desired service from the transmitted service menu at the user terminal, a service menu list is first displayed (Step S131). Here, it is determined whether the content display is selected from the displayed service menu or the end is selected (Step S132). If the end is selected, this selection processing is terminated. If the content display is selected, the selected menu is displayed (Step S133). The user, looking at the displayed menu, decides whether or not the application is made (Step S134). When the application is made, the desired service is selected, and the corresponding menu is marked, that is, the data for the application is inputted (Step S135). By putting a mark to the menu data, it is distinguished from the data for which application is not made. If the application is not made in the decision in Step S134, the processing returns to the service menu list in Step S131.

Figure 29:
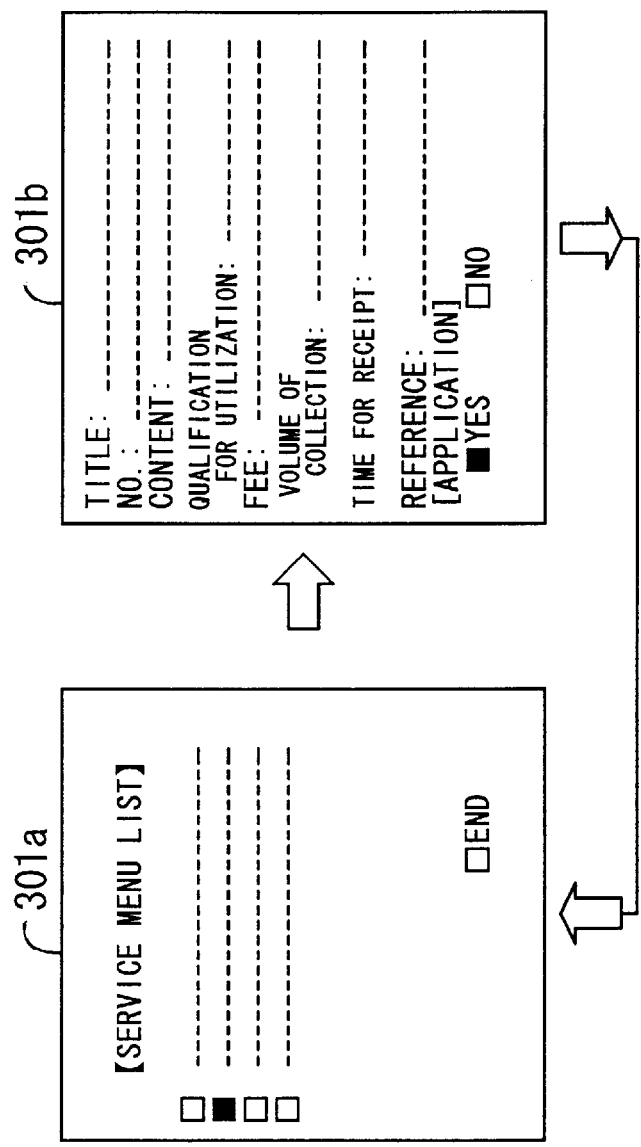
FIG. 29 is a view showing an example of a screen display for service application.

FIG. 29 is a view showing an example of a screen display for a service application.

At the user terminal, the transmitted service menu is first displayed in the form of a list as shown on screen 301a. If the user selects a service in which the user is interested from this service menu list, a screen 301b showing the more detailed service content is displayed. The user checks the content of the screen 301b, and decides whether or not application is made. By putting a mark at an appropriate place, the screen returns to the screen 301a showing the service menu list. If there is another service in which the user is interested, the service is selected by the same operation. If there is no service in which the user is interested, a mark is put at the place of an end, by which the service application processing on the user terminal side is terminated.

Figure 30:
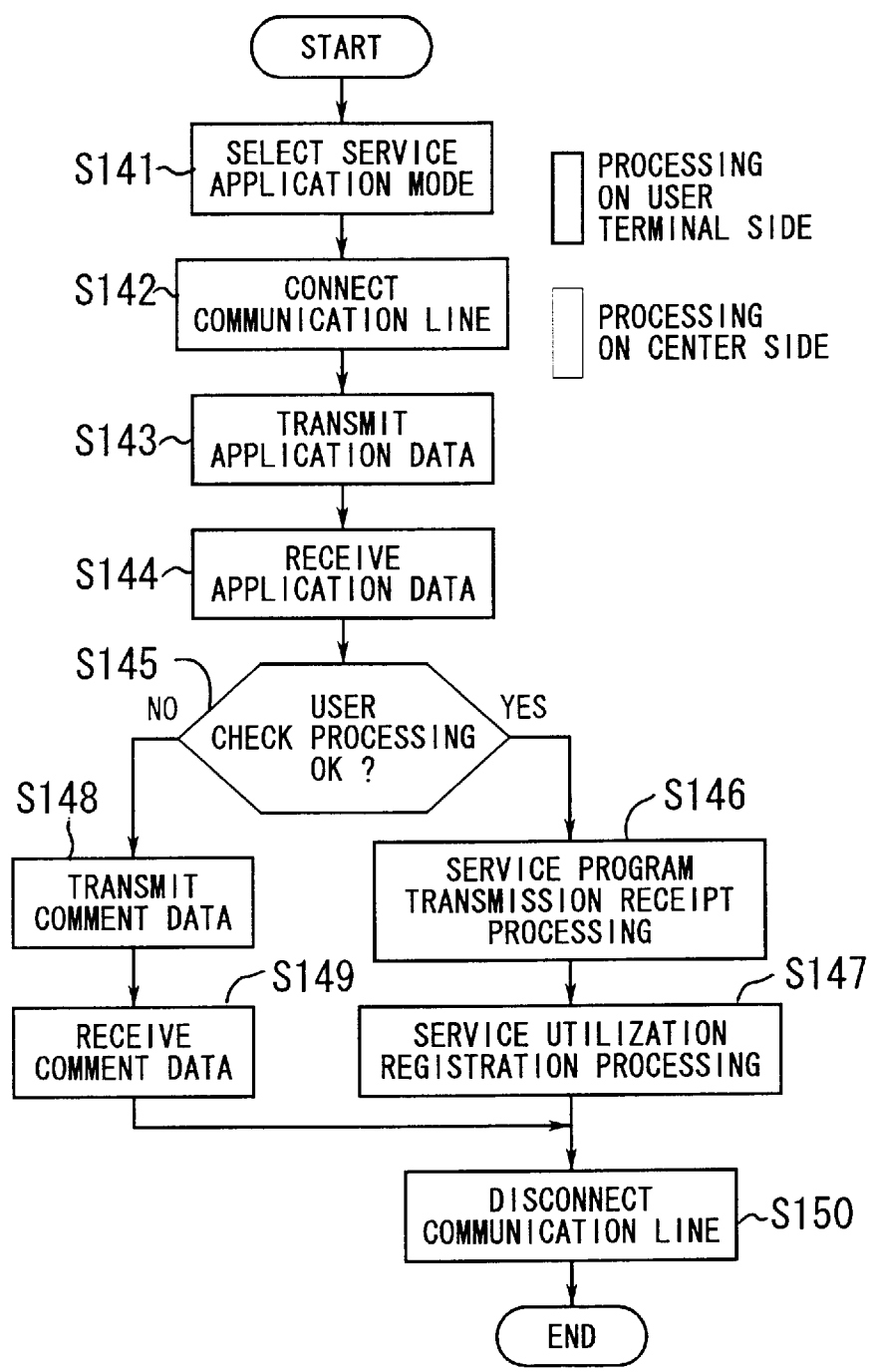
FIG. 30 is a flowchart showing the flow of a processing for making an application for a selected service to an information center.

FIG. 30 is a flowchart showing the flow of a processing for making application for the selected service to an information center.

In this flowchart, a box shown with thick solid line indicates a processing on the user terminal side, and a box shown with thin solid line indicates a processing on the information center side.

When a service is applied for to the information center, a mode for service application is first selected at the user terminal (Step S141). Then, the communication line is connected (Step S142), and the service application data is transmitted (Step S143). At the information center, the transmitted service application data is received (Step S144), and the user check processing is performed based on the service application data (Step S145). Here, if there is no problem in the user check processing, a service program transmission receipt processing is performed (Step S146), and the registration processing for service utilization is performed (Step S147). In the judgment in Step S145, if the user's check is not obtained, the comment data telling this fact is transmitted to the user terminal (Step S148). The user terminal receives the comment data and displays it on the screen of the terminal (Step S149). After the above processing is finished, the communication line is disconnected (Step S150), terminating the application processing.

Figure 31:
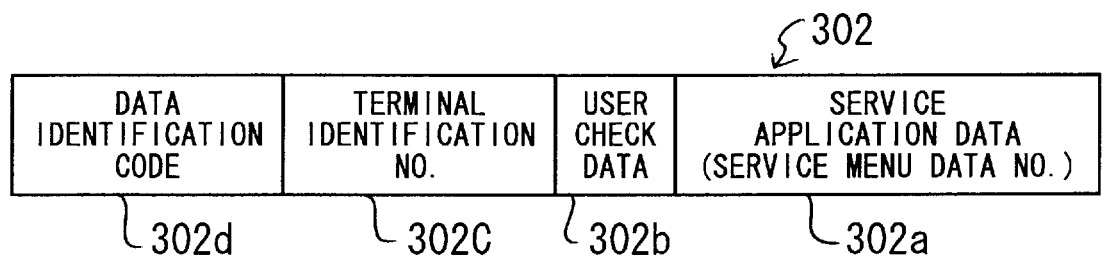
FIG. 31 is a view showing a data configuration of a service application.

FIG. 31 is a view showing a data configuration of service application.

The data for applying for the service from the user terminal to the information center includes a service application data 302a, user check data 302b, terminal identification number 302c, and data identification code 302d. The service application data 302a uses only the service menu data number marked in the service application processing. The user check data 302b, terminal identification number 302c, and data identification code 302d are data used for the check of the user, like the above-described data.

Next, an example of processing will be described below, in which the number of applications for the data introduced by the information center made from the user is monitored, and when the great number of aplications are made, the quantity of introduced data is increased to enhance the quality of the service.

Figure 32:
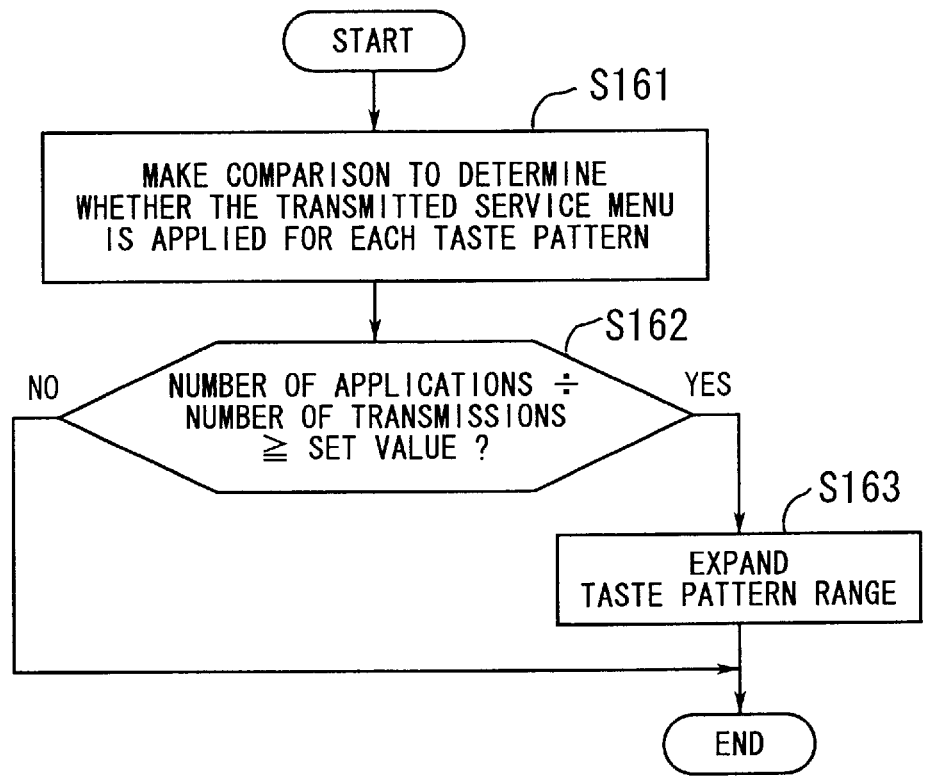
FIG. 32 is a flowchart showing the flow of another processing for expanding the range of a taste feature.

FIG. 32 is a flowchart showing the flow of a processing for expanding the range of the taste feature.

This example shows a case where the taste pattern is expanded. First, comparison is made to determine whether the transmitted service menu is applied for each taste pattern (Step S161). Then, it is determined whether or not the percentage of the application number to the transmission number exceeds a set value (Step S162). If the percentage does not exceed the preset value, the processing is terminated. If the percentage is not less than the preset value, a processing for expanding the taste pattern range is performed (Step S163). Thus, when the number of applications is not less than the preset value with respect to the number of transmissions, it is regarded that the user's desire is strong, so that the taste pattern range is expanded to increase the introduced service menu. This range expansion processing will be described with reference to FIG. 33.

Figure 33:
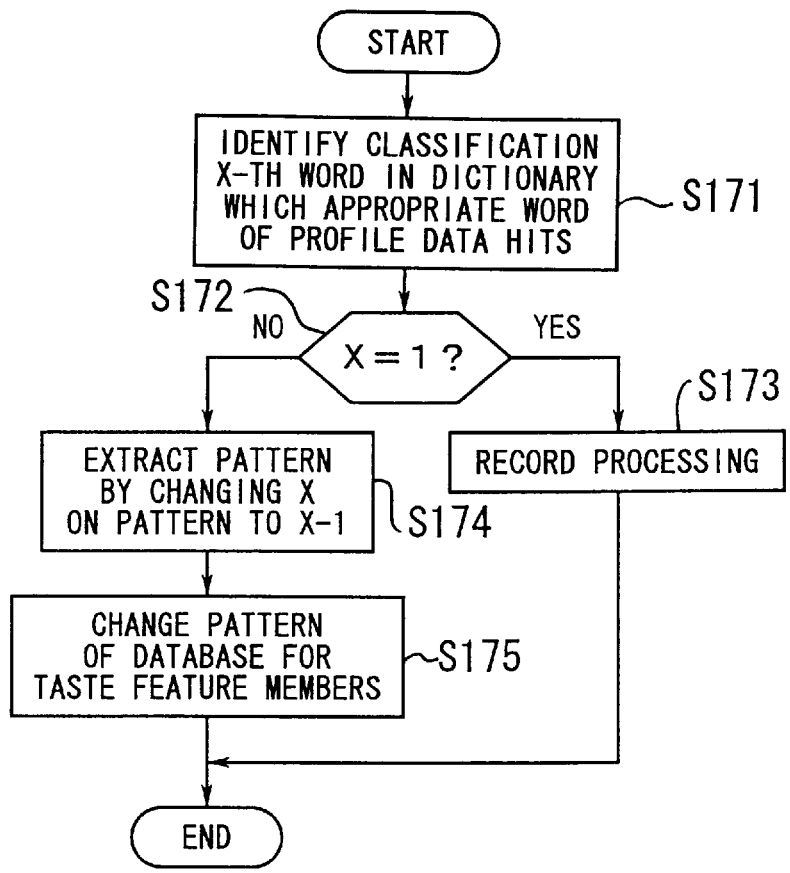
FIG. 33 is a flowchart showing the flow of a processing for expanding the range of a taste pattern.

FIG. 33 is a flowchart showing the flow of processing for expanding the range of the taste pattern.

To expand the range of the taste pattern, the classification X-th word in the dictionary which the appropriate word of the user's profile data hits is first identified (Step S171), and then it is determined whether or not the classification word number X of the taste pattern is 1 (Step S172). If the hit word is the classification first word, the range cannot be expanded further, so that a record processing for telling this fact is done (Step S173) to termine the processing. In the judgment in Step S172, if the hit word is not the classification first word, the pattern is extracted by changing X on the pattern to X-1, that is, at a position one higher than X (Step S174), and the pattern of database for taste feature members is changed (Step S175).

Figure 34:
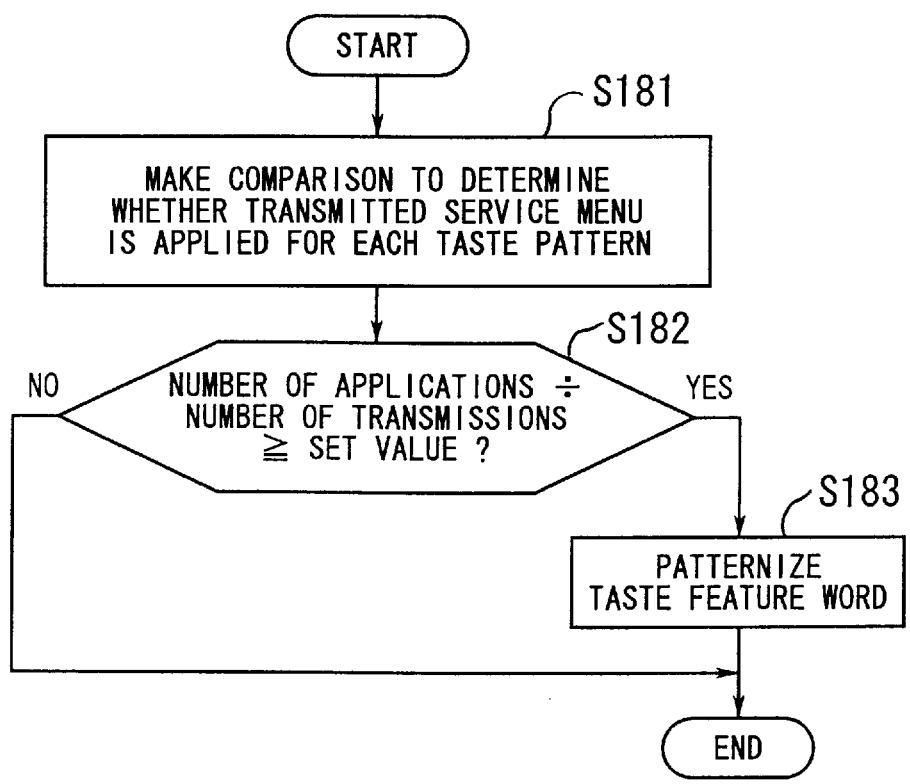
FIG. 34 is a flowchart showing the flow of another processing for expanding the range of a taste feature.

FIG. 34 is a flowchart showing the flow of another processing for expanding the range of the taste feature.

This example shows a case where taste feature words are patternized and expanded. First, comparison is made to determine whether the service menu transmitted for each taste pattern is applied for (Step S181). Then, it is determined whether or not the percentage of the application number to the transmission number exceeds a preset value (Step S182). If the percentage does not exceed the preset value, the processing is terminated. If the percentage is not less than the preset value, the taste feature word is patternized (Step S183). Thus, when the number of applications is not less than the preset value with respect to the number of transmissions, the user's desire is regarded as being strong, so that the corresponding taste feature word is patternized and the range is expanded to increase the introduced service menu. This taste feature word patternizing processing will be described with reference to FIG. 35.

Figure 35:
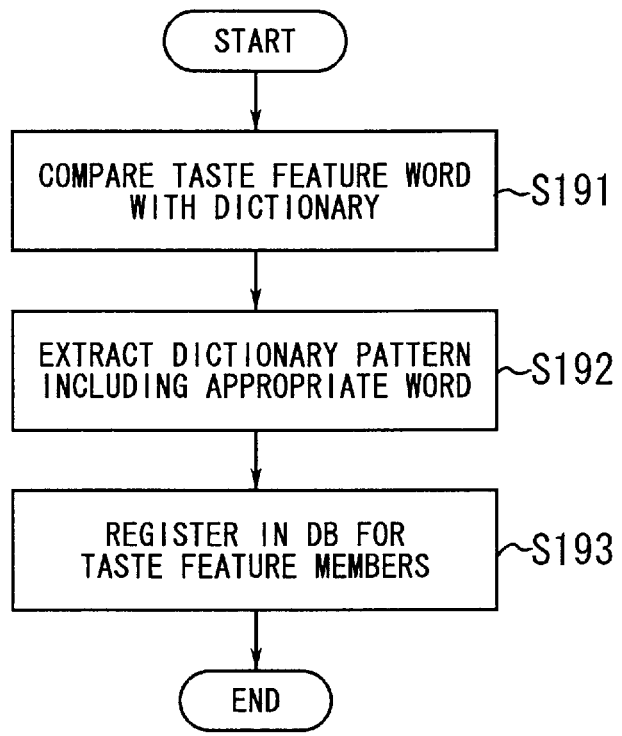
FIG. 35 is a flowchart showing the flow of processing for patternizing taste feature words.

FIG. 35 is a flowchart showing the flow of a processing for patternizing taste feature words.

To patternize the taste feature words and expand the range, first, the taste feature word is compared with the dictionary (Step S191), the dictionary pattern including the appropriate word is extracted (Step S192), and then it is registered in the database for taste feature members (Step S193).

Next, a processing for transmitting service when application is made by the user will be described.

Figure 36:
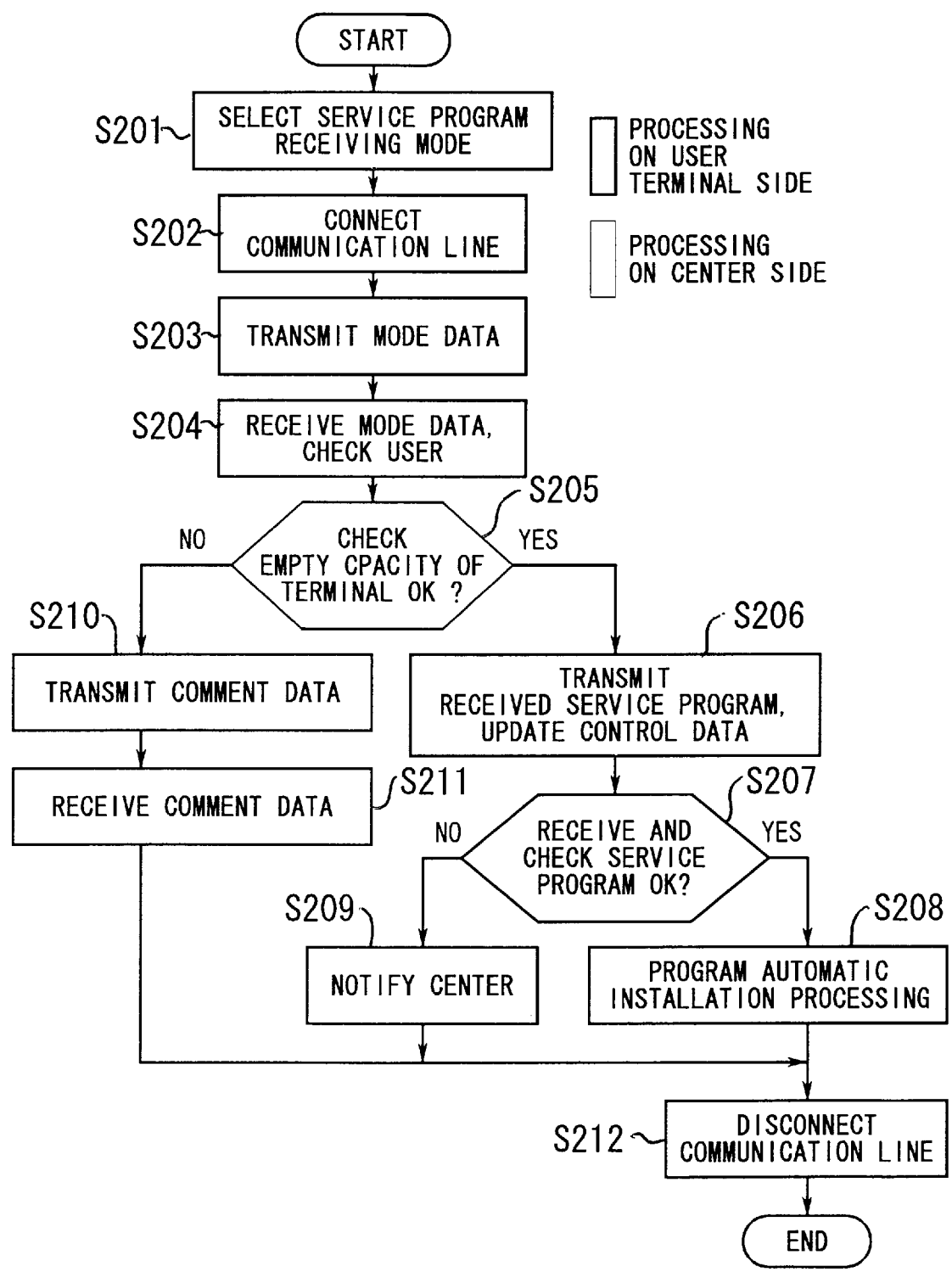
FIG. 36 is a flowchart showing the flow of transmission processing of service programs.

FIG. 36 is a flowchart showing the flow of a transmission processing of a service program.

In this flowchart, a box shown with thick solid line indicates a processing on the user terminal side, and a box shown with thin solid line indicates a processing on the information center side.

At the user terminal, a mode for receiving the service program is first selected (Step S201), the communication line is connected (Step S202), and the mode data for receiving the service program on the user terminal side is transmitted to the information center (Step S203). At the information center, receiving the mode data for receiving the service program from the user terminal, the user check processing is performed (Step S204), and a check is made to see whether the empty capacity of the user terminal is sufficient for storing (Step S205). If the answer is YES, the received service program is transmitted, and the control data is updated (Step S206). At the user terminal, the receiving of the service program is checked (Step S207). If the check result is OK, a processing for automatically installing service program to the user terminal is done (Step S208). If the confirmation is not obtained in Step S207, notification is given to the information center (Step S209). If it is concluded in Step S205 that the empty capacity of the user terminal is insufficient, the information center transmits comment data telling this fact (Step S210). At the user terminal, the comment data is received and displayed (Step S211). Finally, the communication line is disconnected (Step S212), and the transmission processing of the service program is terminated.

Figure 37:
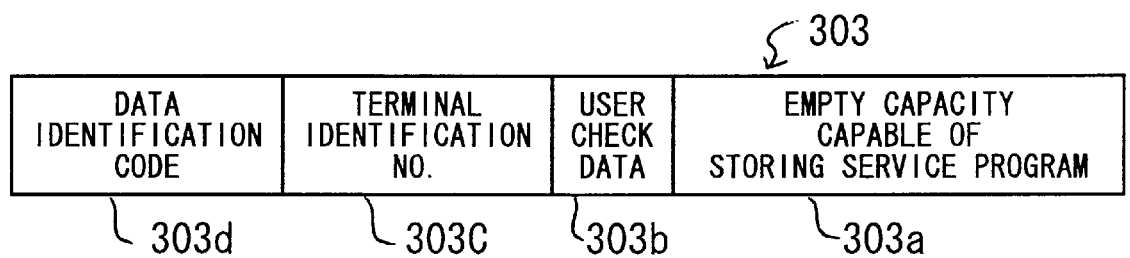
FIG. 37 is a view showing a data configuration of service program receiving mode.

FIG. 37 is a view showing a data configuration of a service program receiving mode.

The data 303 of the service program receiving mode transmitted from the user terminal to the information center includes an empty capacity capable of storing service menu 303a, user check data 303b, terminal identification number 303c, and data identification code 303d. The terminal identification number 303c and the user check data 303b are used to check the user. The empty capacity capable of storing the service menu 303a is a data telling the empty capacity of the terminal. The data identification code 303d indicates that this data is data of the service program receiving mode.

FIG. 38 is a view showing a data configuration for service program transmission.

The data 170 in transmitting the service program sent from the information center to the user terminal includes a service program 170a including version numbers, compression information (program) 170b, terminal identification number 170c, destination code 170d, and data identification code 170e. The information center transmits the program to the user terminal according to the destination code 170d, and on the terminal side, it is judged whether the data is one which has been sent to that terminal by using the terminal identification number 170c. As shown in Step S207 in FIG. 36, when the data is not one which has been sent to that terminal or when a fault occurs in receiving data, notification is given to the information center side. If it can be confirmed, the program is received, and an automatic installation processing is performed in accordance with the installing method indicated in the compression information (program) 170b. The compression information (program) is information telling whether the service program is compressed or not. If being compressed, it indicates the compressing method or the self defreezing program.

Next, the processing for automatically installing service program, shown in Step S208 in FIG. 36, will be described below.

Figure 39:
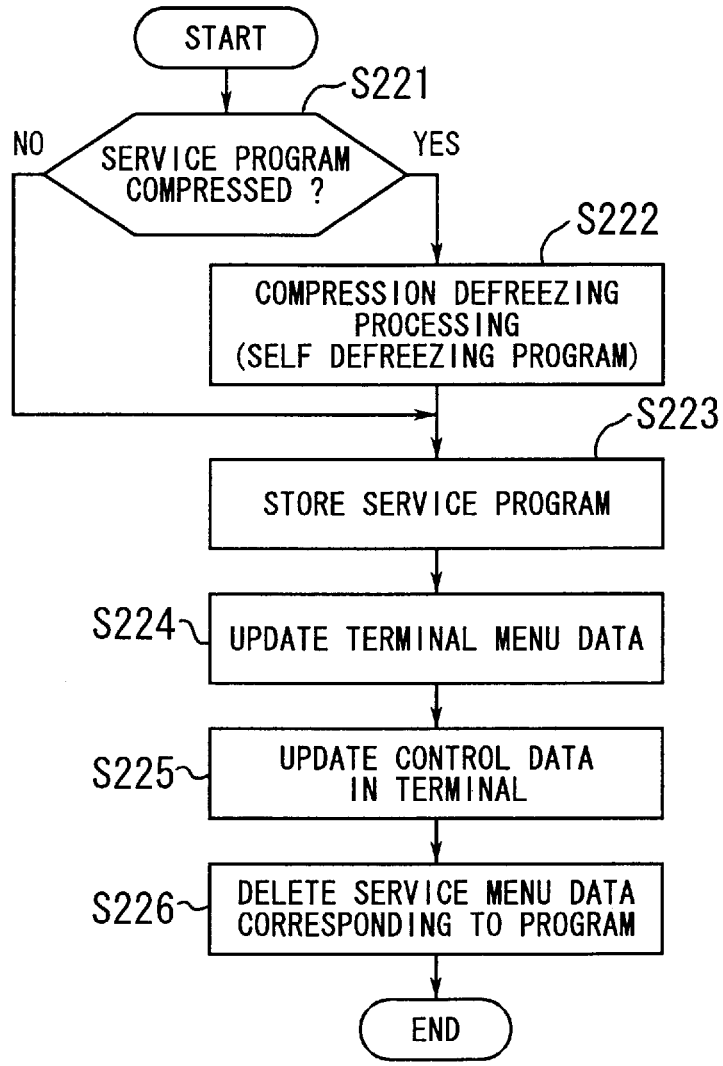
FIG. 39 is a flowchart showing the flow of processing for automatically installing a service program.

FIG. 39 is a flowchart showing the flow of processing for automatically installing a service program.

In the automatic installation processing of the service program, it is first determined whether or not the service program received on the user terminal side is compressed (Step S221). If being compressed, it is defrozen by the software of the user terminal or by executing the transmitted self defreezing program (Step S222), and the defrozen service program is stored in a memory (Step S223). Afterwards, the menu data of the user terminal is updated (Step S224). This is a processing for adding the data for displaying menu, graphics such as icons, etc. Also, the control data in the user terminal is updated (Step S225). This means to rewrite the memory capacity (empty capacity) in the terminal, program receiving record, history data, etc., depending on the functions the user terminal has. Finally, the service menu data corresponding to the service program is deleted from the stored service menu data (Step S226), and the automatic installation processing for the service program is terminated.

Next, the service cancellation processing for stopping the supply of service which has been received until now.

Figure 40:
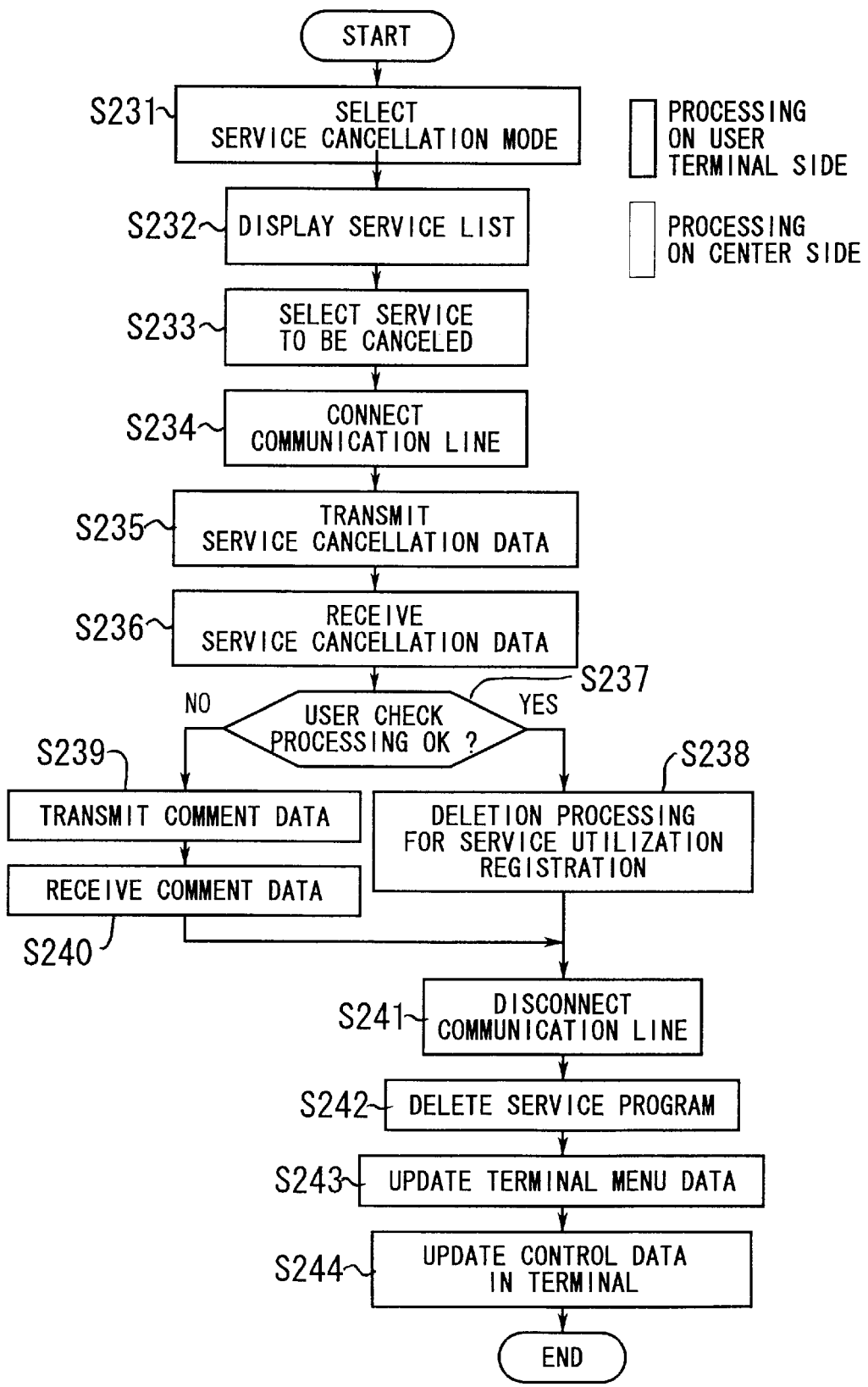
FIG. 40 is a flowchart showing the flow of processing for service cancellation.

FIG. 40 is a flowchart showing the flow of processing for service cancellation.

In this flowchart, a box shown with thick solid line indicates a processing on the user terminal side, and a box shown with thin solid line indicates a processing on the information center side.

When the supply of service becomes unnecessary, the information center is notified of the service cancellation. On receipt of this notification, the information center notifies the service supplier of, for example, the stoppage of the service after the next time when regular service is received, the stoppage of the fee payment in the case of flat rate system, and the change of the number of users for the contract in which the information center gets brokerage commission according to the number of service users.

When service is canceled, on the user terminal side, a service cancellation mode is first selected (Step S231), the list of services currently used is displayed (Step S232). The user, looking at the service list, selects the service to be canceled (Step S233). Then, the user terminal performs a communication line connection processing (Step S234) to transmit the service cancellation data to the information center (Step S235). The information center receives the service cancellation data (Step S236), and performs a user check processing (Step S237). If the user confirmation is obtained, the deletion processing for service utilization registration is performed (Step S238). If the user confirmation is not obtained, the comment telling this fact is transmitted to the user terminal (Step S239). At the user terminal, this comment is received and displayed (Step S240). Afterwards, at the user terminal, a communication line disconnection processing is performed (Step S241), and the deletion of service program (Step S242), the updating of terminal menu data (Step S243), and the updating of control data in the terminal (Step S244) are carried out. The updating of the menu data, in contrast to the case shown in FIG. 39, is a processing for deleting the data for displaying the menu, the graphics such as icons, etc. accompanying the deletion of service program.

Figure 41:
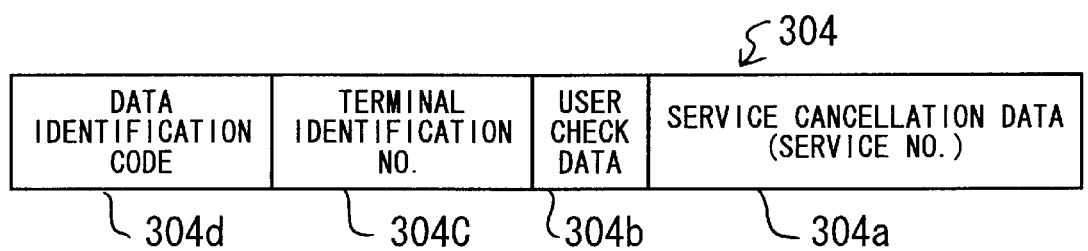
FIG. 41 is a view showing a configuration of service cancellation data.

FIG. 41 is a view showing a configuration of service cancellation data.

The cancellation data 304 used in service cancellation includes service cancellation data 304a, user check data 304b, terminal identification number 304c, and data identification code 304d. For the service cancellation data 304a, the identification number of service selected in Step S233 in FIG. 40 is used. The user check data 304b, terminal identification number 304c, and data identification code 304d are used for checking the user as described above.

Finally, an example of the case where the information is separately transmitted from the service menu data is displayed at the user terminal.

Figure 42:
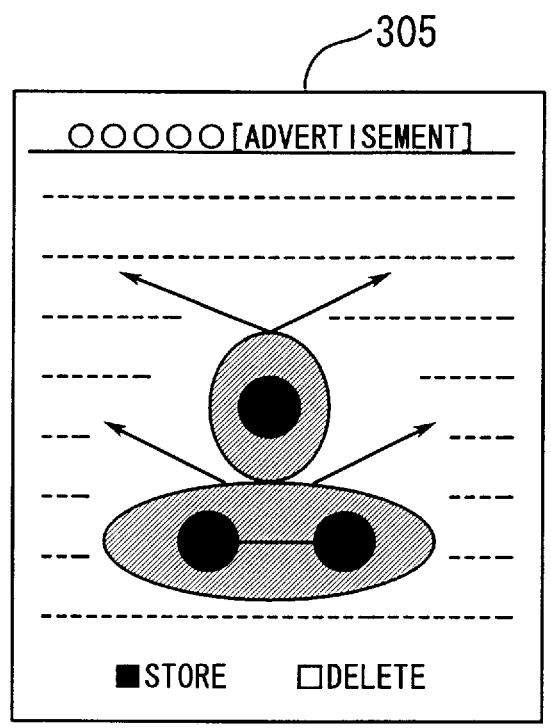
FIG. 42 is a view showing an example of a screen display of supplied information.

FIG. 42 is a view showing an example of a screen display of supplied information.

The user terminal can transmit information in place of service menu and service programs. What is called information here includes advertisement (DM), notice, and guide. The transmitted information is displayed, for example, as a screen 305 shown in FIG. 42.

Also the processing for transmitting information from the registration of the profile data to the transmission of the service menu is performed in the same manner. The only difference is in that the information, not the service menu, that is transmitted. When information is transmitted, there is no processing for subsequent application etc., and the service terminates when the information is transmitted. Although it may be required to offer suplying some transmitted information, such processing is performed outside of the service (for example, telephone is used). The transmitted information is provided with buttons, for example, for deciding whether it is stored or deleted because it is unnecessary. The information is stored or deleted according to the mark condition. The information is stored when being deleted.

As described above, the present invention has a configuration in which the user registers his/her own profile data, by which the service menu matching the profile data is selected and transmitted to the user terminal by service menu transmitting means. Therefore, it is unnecessary for the user to look for a suitable service among many services. Also, when the user applies for a desired service after reviewing the transmitted service menu, service program transmitting means instruct the user about the installing method at the user terminal while transmitting the appropriate service program. Therefore, the service program can be installed automatically, so that the user need not change the terminal function.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A service changeable system for an information center, in which one of a plurality of services received from the information center through a communication line is changed to another of the plurality of services, the system comprising:

profile data registration means, in the information center, for performing a registration processing to create profile data regarding the user upon receipt of a registration request from a user terminal, the profile data indicating a user's tastes regarding the available services;

service menu control means for controlling service menu data regarding the different services handled by the information center;

service menu transmitting means for retrieving the registered profile data and service menu data, creating a service menu specific to the user by selecting services that match the tastes of the user, and transmitting the created menu to the user terminal; and service program transmitting means for receiving a request for one of the plurality of services chosen by the user, based on the created menu, and transmitting a service program which provides the user with the chosen service.

2. A service changeable system at an information center according to claim 1, wherein said profile data includes data for identifying a user.

3. A service changeable system for an information center in which one of a plurality of services received from the information center, is changed to another of the plurality of services, the system comprising:

profile data registration means for performing a registration processing, upon receipt of the registration request from a user terminal, to create profile data for the user, said profile data registration means transmits data of choice of items to be inputted to the user terminal before receiving profile data from the user;

service menu control means for controlling service menu data regarding the different services handled by the information center;

service menu transmitting means for retrieving the registered profile data and service menu data, creating a service menu in accordance with preferences of the user, and transmitting the created menu to the user terminal; and service program transmitting means for receiving an application for a selected service from the user terminal and transmitting a corresponding service program to allow access to the selected service.

4. A service changeable system for an information center in which one of a plurality of services received from the information center, is changed to another of the plurality of services, the system comprising:

profile data registration means for performing a registration processing, upon receipt of the registration request from a user terminal, to create profile data for the user;

service menu control means for controlling service menu data regarding the different services handled by the information center;

service menu transmitting means for retrieving the registered profile data and service menu data, creating a service menu in accordance with preferences of the user, and transmitting the created menu to the user terminal said service menu transmitting means includes taste feature extracting means for extracting the taste feature of a user from the profile data, a dictionary in which the features of the service menu are systematized, and taste feature patternizing means for patternizing the extracted taste feature in comparison with the dictionary and storing the patternized taste feature in taste feature database means included in said profile data registration means; and service program transmitting means for receiving an application for a selected service from the user terminal and transmitting a corresponding service program to allow access to the selected service.

5. A service changeable system at an information center according to claim 4, wherein said taste feature database means is constructed so that the user identification numbers correspond to each pattern.

6. A service changeable system at an information center according to claim 4, wherein said taste feature database means is constructed so that the patternized taste features correspond to each user identification number.

7. A service changeable system at an information center according to claim 4, wherein said service menu transmitting means further has service menu patternizing means for comparing the service menu data of said service menu controlling means with said dictionary and patternizing the survice menu data.

8. A service changeable system at an information center according to claim 7, wherein said service menu transmitting means further includes selecting means for comparing the feature patternized by said service menu patternizing means with the taste feature stored in said taste feature database means and selecting and transmitting service menu data.

9. A service changeable system at an information center according to claim 8, wherein said service menu transmitting means further includes qualification checking means for checking whether the user is qualified for introduction.

10. A service changeable system at an information center according to claim 8, wherein said selecting means has information connecting means for connecting the information other than that being selected with the information to be introduced.

11. A service changeable system at an information center according to claim 4, wherein said service menu transmitting means further includes a selecting means for comparing the service menu data of said service menu controlling means with the taste feature stored in said taste feature database means and selecting and transmitting service menu data.

12. A service changeable system for an information center in which one of a plurality of services received from the information center, is changed to another of the plurality of services, the system comprising:

profile data registration means for performing a registration processing, upon receipt of the registration request from a user terminal, to create profile data for the user;

service menu control means for controlling service menu data regarding the different services handled by the information center;

service menu transmitting means for retrieving the registered profile data and service menu data, creating a service menu in accordance with preferences of the user, and transmitting the created menu to the user terminal, said service menu transmitting means includes taste feature extracting means for extracting the taste feature of a user from the profile data, a dictionary in which the features of the service menu are systematized, and taste feature checking means for comparing the extracted taste feature with the dictionary, checking whether the taste feature has a meaning, and storing the feature in taste feature database means included in said profile data registration means by making the user identification numbers correspond to each checked taste feature; and service program transmitting means for receiving an application for a selected service from the user terminal and transmitting a corresponding service program to allow access to the selected service.

13. A service changeable system for an information center in which one of a plurality of services received from the information center, is changed to another of the plurality of services, the system comprising:

profile data registration means for performing a registration processing, upon receipt of the registration request from a user terminal, to create profile data for the user;

service menu control means for controlling service menu data regarding the different services handled by the information center;

service menu transmitting means for retrieving the registered profile data and service menu data, creating a service menu in accordance with preferences of the user, and transmitting the created menu to the user terminal, said service menu transmitting means includes taste feature extracting means for extracting the taste feature of a user from said profile data, a dictionary in which the features of service menu are systematized, and taste feature checking means for comparing the extracted taste feature with said dictionary, checking whether the extracted taste feature has a meaning, and storing the taste feature in taste feature database means which is included in said profile data registration means by making the taste feature checked by said taste feature checking means correspond to each user identification number; and service program transmitting means for receiving an application for a selected service from the user terminal and transmitting a corresponding service program to allow access to the selected service.

14. A service changeable system for an information center in which one of a plurality of services received from the information center, is changed to another of the plurality of services, the system comprising:

profile data registration means for performing a registration processing, upon receipt of the registration request from a user terminal, to create profile data for the user;

service menu control means for controlling service menu data regarding the different services handled by the information center;

service menu transmitting means for retrieving the registered profile data and service menu data, creating a service menu in accordance with preferences of the user, and transmitting the created menu to the user terminal, at constant time intervals; and service program transmitting means for receiving an application for a selected service from the user terminal and transmitting a corresponding service program to allow access to the selected service.

15. A service changeable system for an information center in which one of a plurality of services received from the information center, is changed to another of the plurality of services, the system comprising:

profile data registration means for performing a registration processing, upon receipt of the registration request from a user terminal, to create profile data for the user;

service menu control means for controlling service menu data regarding the different services handled by the information center;

service menu transmitting means for retrieving the registered profile data and service menu data, creating a service menu in accordance with preferences of the user, and transmitting the created menu to the user terminal; and service program transmitting means for receiving an application for a selected service from the user terminal and transmitting a corresponding service program to allow access to the selected service together with information about the installing the service program at the user terminal.

* * * * *